United States Patent
Xu et al.

(10) Patent No.: US 11,749,797 B2
(45) Date of Patent: *Sep. 5, 2023

(54) NANOSTRUCTURAL DESIGNS FOR ELECTRODE MATERIALS OF FLUORIDE ION BATTERIES

(71) Applicants: HONDA MOTOR CO., LTD., Tokyo (JP); CALIFORNIA INSTITUTE OF TECHNOLOGY, Pasadena, CA (US)

(72) Inventors: Qingmin Xu, Dublin, OH (US); Christopher J. Brooks, Dublin, OH (US); Ryan Mckenney, Roseville, MN (US); Nam Hawn Chou, New Berlin, WI (US); Kaoru Omichi, Tochigi (JP); Simon C. Jones, Whittier, CA (US); Thomas F. Miller, III, South Pasadena, CA (US); Stephen A. Munoz, Pasadena, CA (US)

(73) Assignees: HONDA MOTOR CO., LTD., Tokyo (JP); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/445,022

(22) Filed: Jun. 18, 2019

(65) Prior Publication Data

US 2019/0372111 A1   Dec. 5, 2019

Related U.S. Application Data

(63) Continuation-in-part of application No. 16/444,854, filed on Jun. 18, 2019, and a continuation-in-part of
(Continued)

(51) Int. Cl.
*H01M 4/13*   (2010.01)
*H01M 4/36*   (2006.01)
(Continued)

(52) U.S. Cl.
CPC .............. *H01M 4/366* (2013.01); *H01M 4/38* (2013.01); *H01M 10/056* (2013.01); *H01M 2004/021* (2013.01); *H01M 2004/028* (2013.01)

(58) Field of Classification Search
CPC ......... H01M 10/0561; H01M 10/0562; H01M 10/056; H01M 10/0567; H01M 10/0568;
(Continued)

(56) References Cited

U.S. PATENT DOCUMENTS

| 4,052,539 A | 10/1977 | Shropshire et al. |
| 4,931,172 A | 6/1990 | Kobos et al. |

(Continued)

FOREIGN PATENT DOCUMENTS

| CA | 2781043 A1 | 5/2011 |
| CN | 101156260 A | 4/2008 |

(Continued)

OTHER PUBLICATIONS

Gschwind et al., "Fluoride ion batteries: Theoretical performance, safety, toxicity, and a combinatorial screening of new electrodes", Journal of Fluorine Chemistry, vol. 182, pp. 76-90, 2016.*

(Continued)

*Primary Examiner* — Raymond Alejandro
(74) *Attorney, Agent, or Firm* — ArentFox Schiff LLP; Mark Duell

(57) ABSTRACT

A fluoride shuttle (F-shuttle) battery and nanostructures of copper based cathode materials in the fluoride shuttle battery. The F-shuttle batteries include a liquid electrolyte, which allows the F-shuttle batteries to operate under room temperature. The minimum thickness of copper layer within the copper nanostructures is no more than 20 nm. The (Continued)

thickness of copper layer within the copper nanostructures is controlled and reduced to ensure the energy densities of F-shuttle batteries.

47 Claims, 32 Drawing Sheets
(23 of 32 Drawing Sheet(s) Filed in Color)

Related U.S. Application Data application No. 16/013,739, filed on Jun. 20, 2018, which is a continuation-in-part of application No. 15/844,079, filed on Dec. 15, 2017.

(60) Provisional application No. 62/775,748, filed on Dec. 5, 2018, provisional application No. 62/687,653, filed on Jun. 20, 2018, provisional application No. 62/676,693, filed on May 25, 2018, provisional application No. 62/453,295, filed on Feb. 1, 2017, provisional application No. 62/434,611, filed on Dec. 15, 2016.

(51) Int. Cl.
  *H01M 10/056* (2010.01)
  *H01M 4/38* (2006.01)
  *H01M 4/02* (2006.01)

(58) Field of Classification Search
  CPC ...... H01M 10/39; H01M 10/38; H01M 10/36; H01M 4/366; H01M 4/38; H01M 4/0445; H01M 4/0447; H01M 4/044; H01M 4/0438; H01M 4/133; H01M 4/388; H01M 4/5835; H01M 4/583; H01M 4/58; H01M 4/66; H01M 4/665; H01M 2300/0065; H01M 2300/0068; H01M 2300/008; H01M 2004/021; H01M 2004/028
  See application file for complete search history.

(56) References Cited

U.S. PATENT DOCUMENTS

| | | |
|---|---|---|
| 7,007,972 B1 | 3/2006 | Radhakrishnan et al. |
| 7,722,993 B2 | 5/2010 | Potanin |
| 9,166,249 B2 | 10/2015 | Darolles et al. |
| 9,705,124 B2 | 7/2017 | Walker et al. |
| 2003/0008145 A1 | 1/2003 | Goldstein |
| 2006/0070491 A1 | 4/2006 | Yang et al. |
| 2009/0029237 A1 | 1/2009 | Yazami |
| 2009/0269269 A1 | 10/2009 | White et al. |
| 2010/0178227 A1 | 7/2010 | Kim et al. |
| 2010/0285358 A1 | 11/2010 | Cui et al. |
| 2011/0143219 A1 | 6/2011 | Weiss et al. |
| 2011/0274832 A1 | 11/2011 | Dai et al. |
| 2012/0202112 A1 | 8/2012 | Yushin et al. |
| 2012/0270231 A1 | 10/2012 | Smith et al. |
| 2013/0078510 A1 | 3/2013 | Reynolds et al. |
| 2013/0092885 A1 | 4/2013 | Cho et al. |
| 2013/0115484 A1 | 5/2013 | Li et al. |
| 2013/0122361 A1 | 5/2013 | Yazami |
| 2013/0130109 A1 | 5/2013 | Archer et al. |
| 2013/0133934 A1 | 5/2013 | Flores et al. |
| 2013/0171060 A1 | 7/2013 | Vo-Dinh et al. |
| 2013/0189574 A1 | 7/2013 | Crepel et al. |
| 2013/0196844 A1 | 8/2013 | Keller et al. |
| 2013/0248775 A1 | 9/2013 | Kurihara |
| 2013/0288892 A1 | 10/2013 | Lauterbach et al. |
| 2013/0323595 A1 | 12/2013 | Sohn et al. |
| 2014/0377457 A1 | 12/2014 | Liu et al. |
| 2015/0053464 A1 | 2/2015 | Jeong et al. |
| 2015/0099182 A1 | 4/2015 | Singh et al. |
| 2015/0118496 A1 | 4/2015 | Cho et al. |
| 2015/0155546 A1 | 6/2015 | Yushin et al. |
| 2015/0194661 A1 | 7/2015 | Ju et al. |
| 2015/0311508 A1 | 10/2015 | Cairns |
| 2015/0328629 A1 | 11/2015 | Cho et al. |
| 2016/0017180 A1 | 1/2016 | Schmidt et al. |
| 2016/0029482 A1 | 1/2016 | Young et al. |
| 2016/0043384 A1 | 2/2016 | Zhamu et al. |
| 2016/0087308 A1 | 3/2016 | Nakamoto et al. |
| 2016/0351896 A1 | 12/2016 | Yushin et al. |
| 2017/0062874 A1 | 3/2017 | Jones et al. |
| 2017/0352921 A1 | 12/2017 | Nakamoto et al. |
| 2018/0175382 A1 | 6/2018 | Chou et al. |
| 2018/0214945 A1 | 8/2018 | Chou et al. |
| 2018/0301764 A1 | 10/2018 | Chou et al. |

FOREIGN PATENT DOCUMENTS

| | | | |
|---|---|---|---|
| CN | 101341614 A | 1/2009 | |
| CN | 101501790 A | 8/2009 | |
| CN | 102106025 A | 6/2011 | |
| CN | 102612776 A | 7/2012 | |
| CN | 102714099 A | 10/2012 | |
| CN | 102812586 A | 12/2012 | |
| CN | 103087805 A | 5/2013 | |
| CN | 104332609 A | 2/2015 | |
| CN | 104936728 A | 9/2015 | |
| CN | 106063004 A | 10/2016 | |
| DE | 10 2014 211 907 A1 | 12/2014 | |
| JP | 2007-294196 A | 11/2007 | |
| JP | 2008-536285 A | 9/2008 | |
| JP | 2010-80221 A | 4/2010 | |
| JP | 2010-519682 A | 6/2010 | |
| JP | 2015-8136 A | 1/2015 | |
| JP | 2016-505704 A | 2/2016 | |
| JP | 2016-076499 A | 5/2016 | |
| JP | 2018-63905 A | 4/2018 | |
| KR | 10-2015-0064948 A | 6/2015 | |
| KR | 20160047022 A | 5/2016 | |
| WO | WO 2007/146453 | * 12/2007 | ............. H01M 4/58 |
| WO | WO 2008/048716 A2 | 4/2008 | |
| WO | WO 2009/157033 A2 | 12/2009 | |
| WO | WO 2010/107720 A2 | 9/2010 | |
| WO | WO 2011/063541 A2 | 6/2011 | |
| WO | WO 2012/118446 A1 | 9/2012 | |
| WO | WO 2016/047906 A1 | 3/2016 | |
| WO | WO 2016/068594 A1 | 5/2016 | |
| WO | WO 2017/025957 A1 | 2/2017 | |
| WO | WO 2019/226663 A1 | 11/2019 | |
| WO | WO 2019/246265 A1 | 12/2019 | |

OTHER PUBLICATIONS

"Lutensol(R) AO types" [online], Mar. 2014 (Mar. 2014) [retrieved on Jan. 29, 2020], retrieved from the Internet: <https://biakhlm.com.ua/index.php?option=com_k2&Itemid=1174&id=901_f6cc99717606f04a2abc418ab94cc6b1&lang=ru&task=download&view=item>, 7 pp.; see entire document, especially, p. 2.
International Search Report and Written Opinion, issued by International Searching Authority in counterpart International Patent Application No. PCT/US19/64736, dated Feb. 25, 2020.
B.P. Sobolev et al., "Mechanochemical Synthesis of Nonstoichiometric Fluorite Ca1-xLaxF2+x Nanocrystals from CaF2 and LaF3 Single Crystals" Crystallography Reports, vol. 50, No. 3, pp. 478-485, 2005.
Charles J. McDonald et al., "Hollow latex particles: synthesis and applications" Advanced in Colloid and Interface Science, vol. 99, pp. 181-213, 2002.
Hiroyuki Ohno, "Electrochemical Aspects of Ionic Liquids" Wiley-Interscience, New York, 2005.
N. I. Sorokin et al., "Nonstoichiometric Fluorides-Solid Electrolytes for Electrochemical Devices: A Review" Crystallography Reports, vol. 52., No. 5., pp. 842-863, 2007.
David Lou et al., "Hollow Micro-/Nanostructures: Synthesis and Applications", Advanced Materials, vol. 20, pp. 3987-4019, 2008.

(56) References Cited

OTHER PUBLICATIONS

David W. Oxtoby et al., "Electrochemistry", Principles of Modern Chemistry, 4th Edition, Saunders College Publishing pp. 401-443, 1999.
Hoe Jin Hah et al. "New synthetic route for preparing rattle-type silica particles with metal cores" Chem. Commun., pp. 1012-1013, 2004.
J. McBreen et al., "New approaches to the design of polymer and liquid electrolytes for lithium batteries", Journal of Power Sources, vol. 89, pp. 163-167, 2000.
Lukasz Gorski et al. "Complexes of tetra-tert-butyl-tetraazaporphine with Al (III) and Zr(IV) cations as fluoride selective ionophores" Analytics Chimica Acta 633, pp. 181-187, 2009.
Lukasz Gorski et al., "Fluoride-selective polymeric membrane electrodes based on Zr(IV)-and Al(III)-salen ionophores of various structures", Analytica Chimica Acta 655, pp. 39-46, 2010.
M. Anji et al., "Batteries based on fluoride shuttle", Journal of Materials Chemistry, vol. 21, No. 43, pp. 17059-17062, Nov. 21, 2011.
Nanditha G. Nair et al., "Fluorinated Boroxin-Based Anion Receptors for Lithium Ion Batteries: Fluoride Anion Binding, Ab Initio Calculations, and Ionic Conductivity Studies", The Journal of Physical Chemistry A, vol. 113, pp. 5918-5926, May 2009.
P.J. Gellings et al., "The CRC Handbook of Solid State Electrochemistry", pp. 195-222, 1997.
Perrin Walker et al., "Handbook of Metal Etchants", CRC 1991.
PubChem. Citrate May 27, 2016. Retrieved from Internet: <URL: http://pubchem.ncbi.nlm.nih.gov/compound/citrate>. as viewed on Feb. 6, 2018.
Shinobu Fujihara et al., "Sol-Gel Processiong of LaF3 Thin Films" Journal of the Ceramic Society of Japan vol. 106, pp. 124-126, 1998.
Shlomo Magdassi et al., "Copper Nanoparticles for Printed Electronics: Routes Towards Achieving Oxidation Stability" Materials, vol. 3, pp. 4626-4638, 2010.
Stephan Rudiger et al., "The fluorolytic sol-gel route to metal fluorides—a versatile process opening a variety of application fields", Dalton Transactions, No. 9, pp. 1117-1127, 2008.
V. Trnovcova et al., "Fluoride Solid Electrolytes", Russian Journal of Electrochemistry, vol. 45, No. 6, pp. 630-639, 2009.
William C. West et al., "Reversible Intercalation of Fluoride-Anion Receptor Complexes in Graphite", Journal of the Electrochemical Society, vol. 154, pp. A929-A936, 2007.
Written Opinion and International Search Report of related foreign application No. PCT/US2017/066800 dated Mar. 5, 2018.
International Search Report and Written Opinion, issued by international Searching Authority in counterpart International Patent Application No. PCT/US2019/033334, dated Aug. 2, 2019, (PCT/ISA/210, PCT/ISA/220 & PCT/ISA/237).
Bhatia H. et al., "Conductivity Optimization of Tysonite-type La1-xBaxF3-x Solid Electrolytes for Advanced Fluoride Ion Battery", ACS Applied Materials & Interfaces, Jun. 2017, [retrieved on Jan. 30, 2020], vol. 9, issue 28, 11 Pages total.
Internation Search Report and Written Opinion, issued by International Searching Authority in counterpart International Patent Application No. PCT/US2019/064792, dated Mar. 2, 2020.
Kim H. K. et al., "Reduction of the Work Function of Gold by N-Heterocyclic Carbenes", Chemistry of Materials [online], Apr. 12, 2017 (Apr. 12, 2017) [retrieved on Jan. 30, 2020], vol. 29, Issue 8, pp. 3403-3411.
Zeb G. et al., "Surface Treatments for Controlling Solid Electrolyte Formation on Sn/Graphene Composite Anodes for High-Performance Li-Ion Batteries", Journal of Physical Chemistry C, Jul. 10, 2017 (Jul. 10, 2017) [retrieved on Jan. 30, 2020], vol. 121, issue 31, pp. 16682-16692.
International Search Report and Written Opinion, issued by International Searching Authority in corresponding International Application No. PCT/US2019/037994, dated Sep. 3, 2019, (PCT/ISA/210, PCT/ISA/220 & PCT/ISA/237).
Communication dated Jun. 9, 2020, from the European Patent Office in related European Application No. 17880278.1.
Luiz G. Jacobsohn et al., "Preparation and Characterization of Rare Earth Doped Fluoride Nanoparticles", Materials, vol. 3, No. 3, (2010), ISSN: 1996-1944, pp. 2053-2068.
Michelle Lukosi et al., "Recent advances in gold-metal oxide core-shell nanoparticles: Synthesis, characterization, and their application for heterogeneous catalysis", Frontiers of Chemical Science and Engineering, Higher Education Press, Heidelberg, vol. 10, No. 1, (2016), pp. 39-56.
Benjamin C-K. Tee et al., "An electrically and mechanically self-healing composite with pressure- and flexion-sensitive properties for electronic skin applications", Nature Nanotechnology, vol. 7, 2012 Macmillan Publishers Limited, (8 Pages Total), Dec. 2012.
Christene A. Smith et al., "N-Heterocyclic Carbenes in Materials Chemistry", Chem. Rev. 119, 2019 American Chemical Society, pp. 4986-5056, (2019).
Fan Cui et al., "Synthesis of Ultrathin Copper Nanowires Using Tris(trimethylsilyl)silane for High-Performance and Low-Haze Transparent Conductors", American Chemical Society, NANO Letters, DOI:10.1021/acs.nanolett.5b03422, (2015), (6 Pages total).
Michael A. Webb et al., "Systematic Computational and Experimental Investigation of Lithium-Ion Transport Mechanisms in Polyester-Based Polymer Electrolytes", 2015 American Chemical Society, ACS Cent. Sci. 2015, 1, pp. 198-205, (2015).
Michael A. Webb et al., Supporting Information, Chemically Specific Dynamic Bond Percolation Model for Ion Transport in Polymer Electrolytes, Macromolecules, 48, 7346 (2015), (12 Pages total).
Oxtoby et al., Principles of Modern Chemistry, Electrochemistry, Unit 3: Equilibrium in Chemical Reactions, Fourth Edition, pp. 401-443, (1999).
Philippe Cordier et al., "Self-healing and thermoreversible rubber supramolecular assembly", Nature Letters, vol. 451, 2008 Nature Publishing Group, (4 Pages Total), Feb. 21, 2008.
Thomas F. Miller, III, et al., "Designing Polymer Electrolytes for Safe and High Capacity Rechargeable Lithium Batteries", 2017 American Chemical Society, Acc. Chem. Res. 2017, 50, pp. 590-593, (2017).
Communication dated Dec. 7, 2021, from the Japanese Patent Office in related application No. 2019-532014.
Katia Guerin et al., "Core-Shell Ni—NiF2 as Cathode Materials for Secondary Lithium Batteries", IMLB 2016 (18th International Meeting on Lithium Batteries), (2016) (2 Pages Total), https://ecs.confex.com/ecs/imlb2016/webprogram/Paper76293.html.
Francois Tanguy et al., "Lowering Interfacial Chemical Reactivity of Oxide Materials for Lithium Batteries. A Molecular Grafting Approach", Journal of Materials Chemistry, vol. 19, No. 27, 2009, pp. 4771-4777. The Royal Society of Chemistry (RSC), https://doi.org/ 10.1039/b901387c. (Year: 2009).
Communication dated Mar. 28, 2022, from the State Intellectual Property Office of People's Republic of China in Application No. 201780073648.3.
Li, Ting, et al., "Electrochemical Conversion Reactions and Their Applications for Rechargeable Batteries", Journal of Electrochemistry, vol. 21, No. 2, pp. 115-122, 2015, <http://electrochem.xmu.edu.cn>, (Abstract on p. 122).
Office Action dated Nov. 29, 2022, issued by the Korean Patent Office in related Korean Application No. 10-2019-7019489.

\* cited by examiner

Cu@LaF$_3$

Cu@La$_{0.97}$Ba$_{0.03}$F$_{2.97}$

Cu@LaF$_3$

Cu@La$_{0.97}$Ba$_{0.03}$F$_{2.97}$

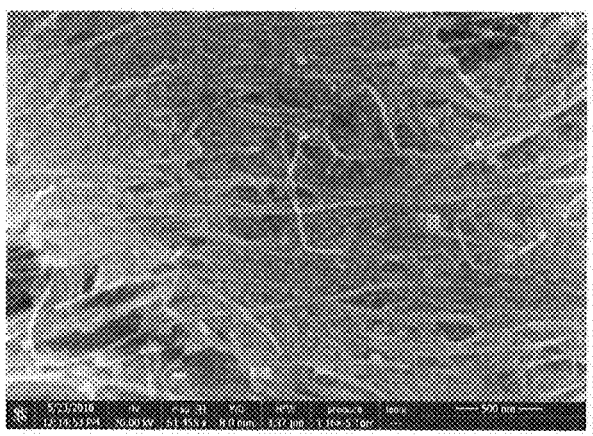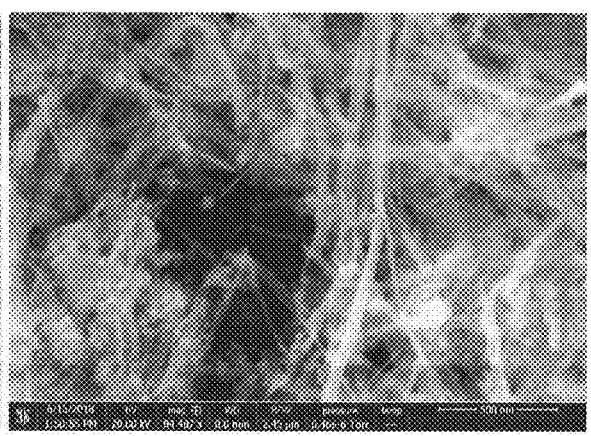
FIG. 15A                          FIG. 15B

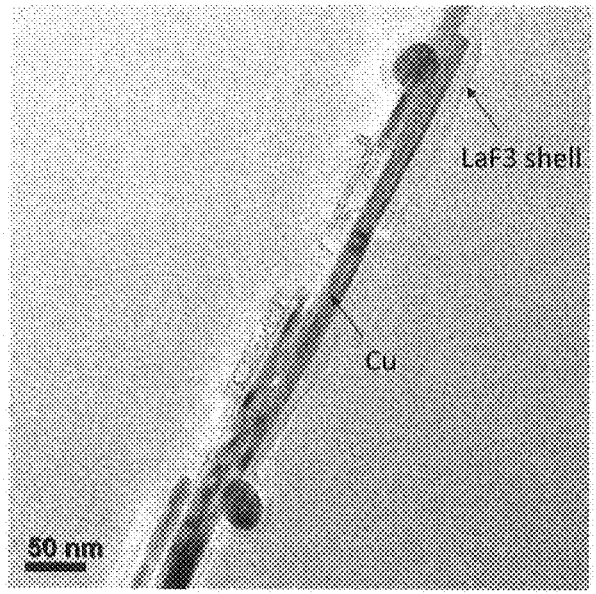 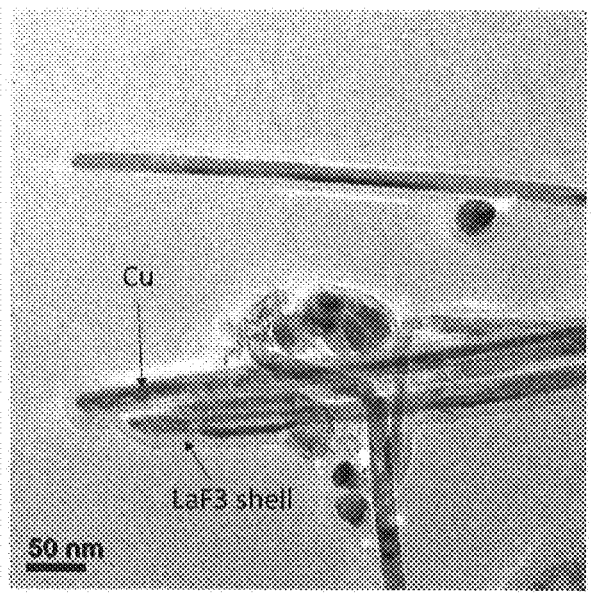
FIG. 16A  FIG. 16B
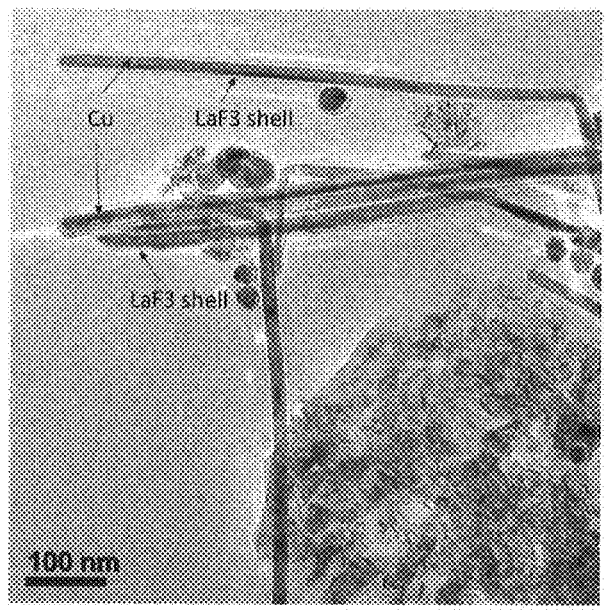
FIG. 16C

NANOSTRUCTURAL DESIGNS FOR ELECTRODE MATERIALS OF FLUORIDE ION BATTERIES

CROSS REFERENCE TO RELATED APPLICATIONS

This application claims priority to each of the following applications, and each of the following applications is hereby incorporated herein by reference in its entirety: U.S. patent application No. 62/687,653, entitled "Barium-Doped Composite Electrode Materials For Fluoride-Ion Electrochemical Cells," filed Jun. 20, 2018; U.S. patent application No. 16/013,739, entitled "Barium-Doped Composite Electrode Materials For Fluoride-Ion Electrochemical Cells," filed Jun. 20, 2018, which claims priority to U.S. patent application No. 62/676,693, entitled "Composite Electrode Materials for Fluoride-Ion Electrochemical Cells," filed May 25, 2018; U.S. patent application No. 15/844,079, entitled "Composite Electrode Materials for Fluoride-Ion Electrochemical Cells," filed Dec. 15, 2017, which issued as U.S. Pat. No. 11,251,420, on Feb. 15, 2022, and which claims priority to U.S. patent application No. 62/434,611, entitled "Composite Electrode Materials for Fluoride-Ion Electrochemical Cells," filed Dec. 15, 2016; U.S. patent application No. 62/453,295, entitled "Core Shell," filed Feb. 1, 2017; U.S. Provisional Application No. 62/775,748 filed Dec. 5, 2018; and U.S. patent application No. 16/444,854 filed Jun. 18th, 2019.

STATEMENT REGARDING FEDERALLY SPONSORED RESEARCH OR DEVELOPMENT

This invention was made with government support under Grant No. 80NM0018D004 awarded by NASA Jet Propulsion Laboratory (JPL). The government has certain rights in the invention.

TECHNICAL FIELD

The present disclosure relates to electrochemically active materials, and more particularly to fluoride ion battery systems that include electrode materials with tailored structures and compositions to improve battery performance. More specifically, this disclosure relates to a fluoride shuttle battery and nanostructures of copper based cathode materials in the fluoride shuttle battery.

BACKGROUND

Metal nanoparticles are highly desirable for use in a number of applications including as catalysts, and as electrode materials for batteries. However, the use of metal nanoparticles may be limited by the system operating conditions or other factors.

F (fluoride) shuttle batteries are a novel and underexplored alternative next generation energy storage. Its energy density is much larger than lithium ion batteries, around four times in volumetric and two times at gravimetric densities. F-shuttle batteries offer lower cost and/or improved safety characteristics compared to lithium and lithium-ion batteries. Fluoride-ion batteries are electrochemical cells that operate via fluoride-mediated electrode reactions. For example, F⁻ anions are shuttled between the cathode and the anode electrodes. During discharge, $MeF_x$ is reduced to Me (metal) or low valence $MeF_x$ and releases F⁻ ions at the cathode side. Meanwhile, F⁻ ions combine with metal to form MeFx and release electrons at the anode side. F-shuttle batteries can be manufactured as primary or secondary batteries.

Transition metal fluorides are usually used as cathode materials, and alkaline earth or rare-earth metals are used as anode materials.

There are two types of F-shuttle batteries, i.e., all-solid-state type and liquid type. Currently most of the research being conducted is focused on all-solid-state F-shuttle batteries, which may be rechargeable at elevated temperatures to some extent. However, slow reaction kinetics impose significant challenges to all-solid-state F-shuttle batteries. Fluoride-ion systems have been demonstrated in the solid state, for example, in U.S. Pat. No. 7,722,993 to Potanin, which describes an embodiment of a secondary electrochemical cell where fluoride ions are reversibly exchanged between anode and cathode electrodes during charge-discharge cycles, with these electrodes in contact with a solid-state fluoride-conducting electrolyte. Potanin describes solid state electrolytes containing fluorides of La, Ce or the compound fluorides based on them, together with alloying additives, such as fluoride/fluorides of alkaline-earth metals ($CaF_2$, $SrF_2$, $BaF_2$) and/or fluorides of alkaline metals (LiF, KF, NaF) and/or alkaline metal chlorides (LiCl, KCl, NaCl), as well as a wide range of other compound fluorides. However, such electrochemical cells only operate usefully above room temperature (e.g. 150° C.) due to the limited conductivity of the solid-state electrolyte.

Reaction kinetics are good in the liquid type F-shuttle batteries. However, this type of F-shuttle battery still faces many challenges, such as the lack of good electrolytes and reversible cathode/anode materials at room temperature.

Recently, a F-shuttle battery assembled with heavy metals was reported to be reversible in an ionic liquid-based electrolyte at room temperature, where Bi was used as a cathode and Pb was used as an anode (K Okazaki, et al., Charge-Discharge Behavior Of Bismuth In A Liquid Electrolyte For Rechargeable Batteries Based On A Fluoride Shuttle, *Acs Energy Letters*, 2017, 2 1460-1464). However, the battery had a low voltage (~0.2V) and a low capacity (maximum 0.15 mAh). Furthermore, Pb, which is known to be toxic and not environmental friendly, is used as anode in such a battery. Other attempts have also been made to provide fluoride ion-based electrochemical systems capable of using liquid electrolytes. For example, US 2011/0143219 A1 by Weiss et al. and U.S. Pat. No. 9,166,249 by Darolles et al. disclose fluoride-ion battery configurations that include a solvent-borne fluoride salt that is at least partially present in a dissolved state in the electrolyte. However, for many applications the chemical reactivity of the electrode materials with the liquid electrolyte is significant, and these liquid electrolyte systems do not provide sufficiently reliable high discharge and/or high capacity operation.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a fluoride shuttle battery which comprises a cathode, an anode, and an electrolyte between the cathode and the anode, wherein the cathode includes a cathode material, which comprises a metal nanostructure core and a shell layer surrounding the core.

These and other aspects of the invention will become more fully understood upon a review of the detailed description, which follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15A shows a SEM image of Cu nanowires after initial synthesis and before the two phase shell formation, according to some aspects of the present disclosure.

FIG. 15B shows a SEM image of two phase $LaF_3$ shell formation on Cu nanowires, according to some aspects of the present disclosure.

FIGS. 16A, 16B, and 16C show TEM images of $LaF_3$ formation on/around Cu nanowires under different magnifications/resolutions, according to some aspects of the present disclosure.

DETAILED DESCRIPTION

Figure 1A:
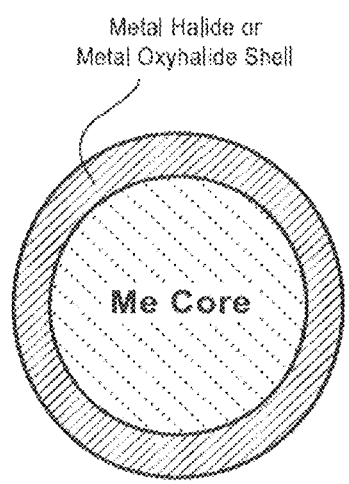
FIG. 1A shows a cross section of a core-shell nanoparticle including a core comprising a metal nanoparticle, and a shell comprising a metal halide or a metal oxyhalide in an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In general, the present disclosure is related to electrochemically active materials, and fluoride-ion battery systems that include electrode materials with tailored structures and compositions to improve battery performance. In some aspects, the present disclosure is related to core-shell nanoparticles, devices incorporating the core-shell nanoparticles, as well as methods of making and using the core-shell nanoparticles and devices including the core-shell nanoparticles.

As used herein, the core is not limited to particles, e.g., spherical particles, and also encompasses structures including, but not limited to, nanoparticles, nanotubes, nanowires, frames, flakes, nanoporous, sheets, thin films, and foams. In an embodiment, the size of the core material is determined either by electron conductivity or $F^-$ ion mobility. In an illustrative example, 20 nm may be the distance limit of $F^-$ ion penetration in the core material. If the path of either electron or $F^-$ is greater than 20 nm, resistance to this will prevent it. Accordingly, a spherical core particle having a diameter of less than or equal to 20 nm may be applied as the spherical particle has less than or equal to 20 nm pathway in all directions. Therefore, all or nearly all of the core material can be utilized, thereby reducing the weight and volume of the cathode. However, the core is not limited to spherical particles. Other core structures may be used that have a dimension that is greater than 20 nm, if it has, for example, a pathway of 20 nm or less in one direction. So while the spherical particle has less than or equal to 20 nm pathway in all directions, a flake (like a piece of paper, for example) may have very large distances in the x and y direction, but if diffusion/electron transport only occurs in the Z direction of 20 nm or less, since that is path of least resistance, it will dominate.

Primary and secondary electrochemical cells, such as batteries, utilizing fluoride ion charge carriers, active electrode materials, and suitable liquid electrolytes can provide an alternative to conventional state of the art lithium batteries and lithium ion batteries. Such fluoride-ion battery (FIB) systems can operate usefully at room temperature while utilizing fluoride anions carried in a liquid electrolyte as at least some of the charge carriers in an electrochemical cell. The FIB system has an anode and cathode physically separated from each other, but in common contact with a fluoride ion conducting electrolyte. The anode is typically a low potential element or compound, and can be a metal, metal fluoride, or intercalating composition. Similarly, the cathode can be element or composition, and can be a metal, metal fluoride, or intercalating composition that has a higher potential than the anode. Fluoride ions ($F^-$) in the fluoride conducting electrolyte go from the cathode to the anode during discharge and from the anode to the cathode during the charge of the battery (FIG. 2):
Discharge:

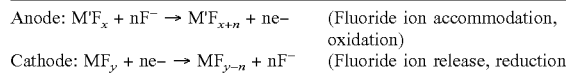

| Anode: $M'F_x + nF^- \rightarrow M'F_{x+n} + ne-$ | (Fluoride ion accommodation, oxidation) |
| Cathode: $MF_y + ne- \rightarrow MF_{y-n} + nF^-$ | (Fluoride ion release, reduction) |

Transition metal fluorides are preferably used as cathode materials and alkaline earth or rare-earth metals are preferably used as anode materials. Examples of suitable anode and cathode metals are depicted in FIG. 1C.

During charge, the reverse reactions occur. For example, a FIB cell reaction based on fluoride anion transfer between Ca and Cu, both metals capable of forming metal fluorides, might be:

Discharge:

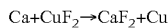

$Ca + CuF_2 \rightarrow CaF_2 + Cu$

Charge:

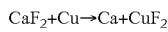

$CaF_2 + Cu \rightarrow Ca + CuF_2$

Two major challenges exist to enable stable, reliable long-term cycling of FIB electrodes. Firstly, reversibility of the electrochemical reactions above is observed when the metal or metal fluoride active materials are nano-sized (i.e. at least one of the particle size dimensions is less than 1 μm). However, particles with such small dimensions have high surface energies and are often reactive with the electrolyte components (e.g. $F^-$) to give undesirable side-reactions including "self-discharge" (i.e. a chemical reaction such as $M + nF^- \rightarrow MF_n$ that does not general electrical current). What is needed is formation of a coating, shell, layer or the like to encapsulate the active material particles while still permitting passage of $F^-$ ions when desired (i.e. during electrochemical charge or discharge) The encapsulating material can also protect the active materials from such side-reactions, enabling long-term cycling stability of these electrode materials.

Secondly, such electrochemical reactions are conversion processes, with the structure of the metal or metal fluoride being broken down during the electrochemical process and reformed as the metal fluoride or metal, respectively, during the process. This conversion process results in a significant volume change between charged and discharged states of the active material, as indicated by the examples given in Table 1 below:

TABLE 1

Volume Change In Metal To Metal Fluoride Conversion

| Metal | Metal Fluoride | Volume Change During Conversion $M + nF^- \rightarrow MF_n$ |
|---|---|---|
| Fe | $FeF_3$ | 311% |
| Pb | $PbF_2$ | 73% |
| Bi | $BiF_3$ | 134% |
| Co | $CoF_3$ | 351% |
| Cu | $CuF_2$ | 238% |
| Sn | $SnF_2$ | 113% |
| La | $LaF_3$ | 46% |
| Ca | $CaF_2$ | −5% |
| Mg | $MgF_2$ | 42% |
| Li | LiF | −24% |

Such significant volume changes limit usefulness of conformal protective coatings encapsulating an FIB electrode material particle, since one particular state of charge will not necessarily be conformal with the particle in a different state of charge, due to the volume changes. What is needed are compositions and processes that protect the electrode active material from side reactions with the electrolyte, allow ion conduction through an encapsulant, and have sufficient void space within the encapsulant and/or encapsulant expansion/ contraction properties to accommodate the volume changes of the active material during charge and discharge without permitting direct contact between the active material and the electrolyte. In some embodiments, sufficient void space may be no void space. Such compositions and their preparation are outlined below.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

Figure 1B:
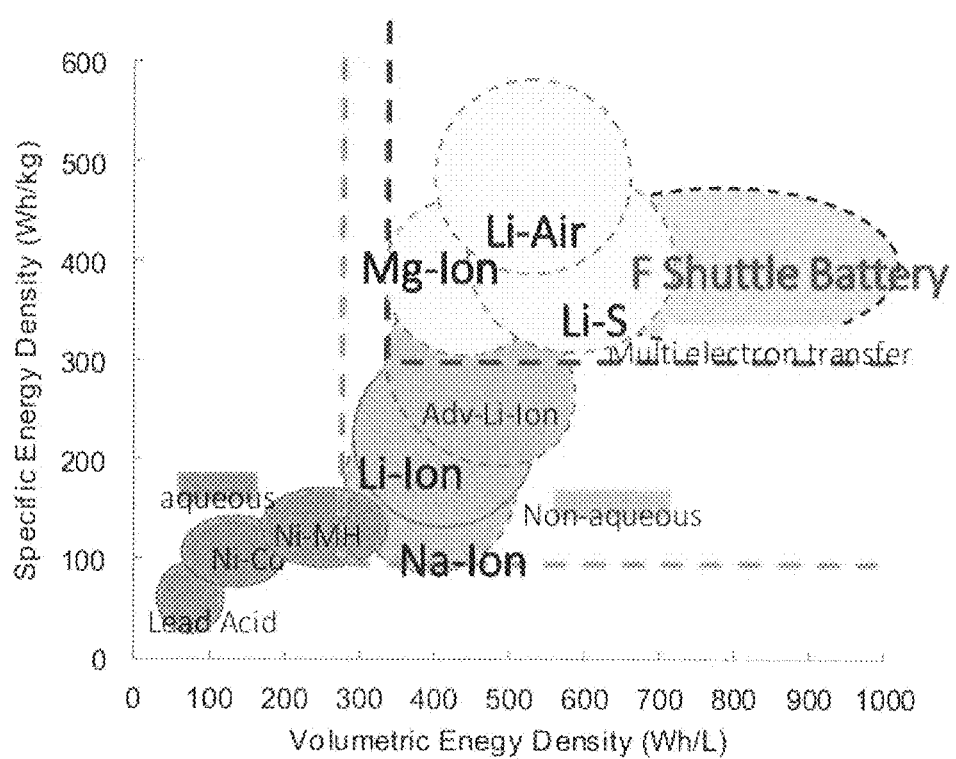
FIG. 1B depicts energy densities of various types of batteries.
Figure 1C:
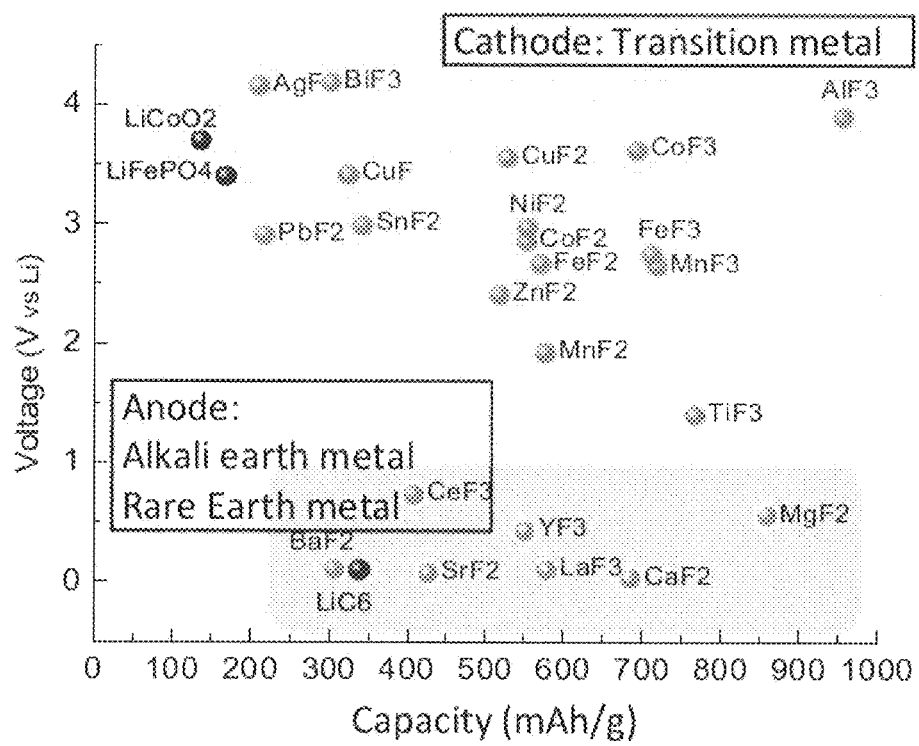
FIG. 1C depicts examples of suitable anode and cathode metals.
Figure 2:
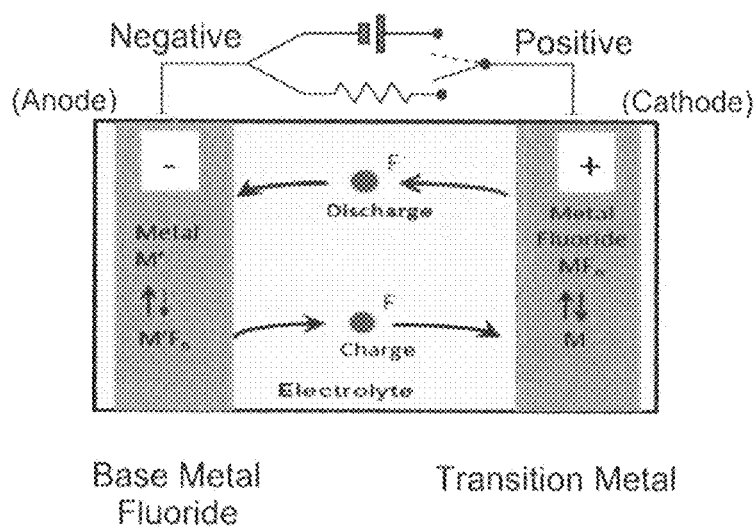
FIG. 2 is a schematic illustration of a fluoride ion electrochemical cell in an aspect of the present disclosure.

In some embodiments as shown in FIG. 1A, the core-shell nanoparticles include a core that comprises a metal or metal alloy ("Me"), and a shell that comprises a metal halide or a metal oxyhalide. The metal of the core may be the same as the metal of the metal halide shell. In some embodiments, the metal of the core and the metal of the metal halide or metal oxyhalide shell are different metals. In some embodiments, the metal halide shell may itself comprise two metals. The core-shell nanoparticles of the present disclosure may be incorporated into a variety of methods and applications including, but not limited to, electrodes for use in electrochemical cells, including fluoride shuttle batteries as shown in FIG. 2. Compared to lithium ion batteries, F-shuttle batteries have much higher energy density, which is around four times in volumetric and two times at gravimetric densities. The energy densities of various types of batteries are illustrated in FIGS. 1B and 1n Table 2 below:

TABLE 2

Energy Densities of F-Shuttle Batteries and Lithium Ion Batteries

|  | AN (−) | CA (+) | Specific Energy (Wh/kg) | Volumetric Energy (Wh/L) |
| --- | --- | --- | --- | --- |
| F-Shuttle Battery | $MgF_2$ | Co | 1354 | 6207 |
|  | $CaF_2$ | Fe | 1086 | 4597 |
|  | $CaF_2$ | Co | 1404 | 6165 |
|  | $MgF_2$ | Bi | 716 | 4727 |
|  | $MgF_2$ | Ni | 1067 | 4894 |
|  | $LaF_3$ | Ni | 1014 | 6918 |
|  | $YF_3$ | Cu | 1042 | 5348 |
|  | $LaF_3$ | Bi | 725 | 5924 |
| Li Ion Battery | Graphite | $LiCoO_2$ | 380 | 953 |
|  | Graphite | $LiFePO_4$ | 407 | 936 |

The metals or metal alloys used to form the core include, but are not limited to, iron nanoparticles, cobalt nanoparticles, nickel nanoparticles, copper nanoparticles, lead nanoparticles, and alkaline earth metal nanoparticles. In a preferred embodiment, the metal nanoparticles are selected from the group consisting of cobalt nanoparticles and copper nanoparticles. In another preferred embodiment, the metal nanoparticles are copper nanoparticles. The metals used to form the core may be synthesized by mixing a metal precursor solution with a reducing agent to form metal nanoparticles.

In some embodiments, the metal nanoparticles used to form the core may be synthesized in the presence of a stabilizer that prevents or otherwise inhibits oxidation of the metal nanoparticles during synthesis, and is readily removable from the metal nanoparticles prior to formation of the metal halide or metal oxyhalide shell thereon. For example, bulky polymers such as polyvinylpyrrolidone (molecular weight of 55,000 g/mol) used during metal nanoparticle synthesis inhibit oxidation of metal nanoparticles. However, such stabilizers are not readily removable from the metal nanoparticles following synthesis. Without being limited to any particular theory, residual stabilizer can form an additional layer between the core formed by the metal nanoparticles and the metal halide or oxyhalide shell that detracts from the performance of the core-shell nanoparticle in the desired system. For example, it is desirable to maintain the conductivity of core-shell nanoparticles used as electrode material in an F-Shuttle battery. However, core-shell materials including an additional layer of residual stabilizer between the core and the shell will likely result in an increased space between electrode materials; the additional layer of residual stabilizer and/or the resulting increased space may decrease the conductivity of the core-shell material. Without wishing to be bound to any particular theory, the additional layer of stabilizer may impede contact between the core and the shell to conduct fluoride ion, while the absence of the stabilizer may increase the likelihood of conducting fluoride ion from the core to the shell.

Therefore, a stabilizer may be used in the synthesis of the metal nanoparticles used to form the core that is readily removable therefrom to minimize the amount of stabilizer on the surface of the core prior to formation of the metal halide or metal oxyhalide shell directly thereon. In a non-limiting example, the one or more stabilizers that may be used in the synthesis of the metal nanoparticles includes a molecular weight (either individually or a weight average) of less than 1000 g/mol, optionally less than 500 g/mol, optionally less than 375 g/mol, and optionally less than 350 g/mol. Illustrative examples include hexadecyltrimethylammonium bromide (CTAB) with a molecular weight of 364 g/mol, citric acid with a molecular weight of 192 g/mol, and mixtures thereof.

In some embodiments, the shell of the core-shell nanoparticles may be formed by mixing isolated metal nanoparticles used to form the core with, for example, a metal salt solution and a halide salt solution that react to form the metal halide shell on the core. The shell is deposited directly on the metal core and may entirely surround the core as shown in FIG. 1A. In some embodiments, the metal salt used to form the shell is selected from the group consisting of alkali metal salts, alkaline earth metal salts, and transition metal salts. In certain embodiments, the metal salt used to form the shell is a transition metal salt. In certain embodiments, the metal salt used to form the shell is selected from the group consisting of lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride. In a non-limiting example, the shell comprises a metal fluoride or metal oxyfluoride containing material (i.e. $CeF_3$, CeOF, LaOF, $LaF_3$).

In some embodiments, the metal salt solution comprises two metal salts. In some such embodiments, one of the two metal salts is a barium salt. In some embodiments, the metal salt solution comprises a barium salt and a lanthanum salt. In some embodiments, the metal salt solution comprises barium nitrate and lanthanum nitrate. In some embodiments, the metal salt solution comprises barium nitrate and lanthanum nitrate in a ratio of about 1:10.

In other embodiments, the core (or electrode active material) may be separated from the shell (or encapsulant) by a void space. Compositions and processes according to such embodiments may protect the electrode active material from side reactions with the electrolyte, allow ion conduction through an encapsulant, and have sufficient void space within the encapsulant and/or encapsulant expansion/contraction properties to accommodate the volume changes of the active material during charge and discharge, without permitting direct contact between the active material and the electrolyte.

The terms core and electrode active material are used interchangeably herein. Similarly, the terms shell and encapsulant are used interchangeably herein.

In other embodiments, the present disclosure is directed to an electrode comprising the core-shell nanoparticles disclosed herein. All aspects and embodiments described with respect to the core-shell nanoparticles and methods of making thereof apply with equal force to the electrode. In a non-limiting example, the electrode is part of an F-shuttle battery system.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is barium. All aspects described with respect to the aforementioned embodiments apply to the present embodiment with equal force, and vice versa.

In some aspects, the active material comprises copper nanoparticles.

In some aspects, the fluoride-containing shell is directly attached to the core.

In some aspects, the second metal is lanthanum.

In some aspects, the barium and the lanthanum are present in a ratio of x to 1-x.

In some aspects, x is about 0.03 to about 0.15.

In some aspects, x is about 0.03.

In some embodiments, the present disclosure is directed to a method of making coated metal nanoparticles, the method comprising: a) providing a water/metal nanoparticle mixture; b) exposing the water/metal nanoparticle mixture to an inert atmosphere; and c) forming a fluoride-containing shell around a metal nanoparticle core, wherein the fluoride-containing shell comprises a first metal and a second metal, and the first metal is barium. All aspects described with respect to the aforementioned embodiments apply to the present embodiment with equal force, and vice versa.

In some aspects, the metal nanoparticles comprise copper nanoparticles.

In some aspects, the fluoride-containing shell is directly attached to the core.

In some aspects, the second metal is lanthanum.

In some aspects, the barium and the lanthanum are present in a ratio of x to 1-x.

In some aspects, x is about 0.03 to about 0.15.

In some aspects, the forming the fluoride-containing shell comprises adding a first metal salt, a second metal salt, and a fluoride-containing salt to the water/metal nanoparticle mixture to create a fluoride-containing shell around the metal nanoparticle core, wherein the first metal is a barium salt.

In some aspects, the second metal is a lanthanum salt.

In some aspects, the first metal salt is barium nitrate and the second metal salt is lanthanum nitrate.

In some aspects, the barium nitrate and the lanthanum nitrate are used in a molar ratio of about 1:10.

In some embodiments, the present disclosure is directed to an electrode comprising: a core comprising copper nanoparticles, and a fluoride containing shell at least partially surrounding the copper nanoparticles, wherein the fluoride-containing shell comprises barium and lanthanum in a ratio of x to 1-x. All aspects described with respect to the aforementioned embodiments apply to the present embodiment with equal force, and vice versa.

In some aspects, x is about 0.03 to about 0.15.

In some aspects, the present disclosure is directed to a fluoride shuttle battery comprising the electrode and a liquid electrolyte. Non-limiting examples of liquid electrolytes are described in U.S. patent application Ser. No. 15/228,876.

An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

A "reducing agent" is a substance that causes the reduction of another substance, while it itself is oxidized. Reduction refers to a gain of electron(s) by a chemical species, and oxidation refers to a loss of electron(s) by a chemical species.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, *neptunium*, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "halide salt" is an ionic complex in which the anion(s) is(are) halide ion(s), including but not limited to fluoride ion(s), chloride ion(s), bromide ion(s), and iodide ion(s). A "fluoride salt" is an ionic complex in which the anion(s) is(are) fluoride ion(s). According to the present disclosure, the cation of the halide salt or the fluoride salt may be any positively charged chemical species.

A "metal fluoride" is an ionic complex in which the cation is one or more metal ion(s) and the anion(s) is(are) fluoride ion(s). According to some aspects of the present disclosure, the metal salt(s) and the fluoride salt react to create a metal fluoride shell around the metal nanoparticle core. Similarly, a "metal halide" is an ionic complex in which the cation is one or more metal ion(s) and the anion(s) is(are) halide ion(s).

A "fluoride-containing" salt is an ionic complex in which the anion(s) contain fluoride ion but are not limited to being solely fluoride. Instead, "fluoride-containing" salts include ionic complexes where the anion(s) contain fluoride itself in complex with other ions or atoms. "Fluoride-containing" salts suitable for use in aspects of the present disclosure include those known to persons of ordinary skill in the art, including, but not limited to, fluoride salts, non-metal fluoroanions such as tetrafluoroborate salts and hexafluorophosphate salts, and oxyfluoride salts. In some aspects of the present disclosure, the fluoride-containing salts may include quaternary ammonium fluorides and fluorinated organic compounds. According to some aspects of the present disclosure, the metal salt and the fluoride-containing salt react to create a fluoride-containing shell around the metal nanoparticle core.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than (xi) the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations. Electrodes are manufactured as known in the art, including as disclosed in, for example, U.S. Pat. No. 4,052,539, and Oxtoby et al., Principles of Modem Chemistry (1999), pp. 401-443.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems. General cell and/or battery construction is known in the art (see, e.g., Oxtoby et al., Principles of Modem Chemistry (1999), pp. 401-443).

"Electrolyte" refers to an ionic conductor which can be in the solid state, the liquid state (most common), or more rarely a gas (e.g., plasma).

The present disclosure is directed generally to an electrochemically active structure comprising a core and a shell at least partially surrounding the core, wherein the core comprises an electrochemically active material and the shell comprises a shell material. The present disclosure is also directed to a method of making the electrochemically active structure as described herein as well as electrochemical cells comprising the electrochemically active structure as described herein.

The electrochemically active structure as described herein comprises a core, wherein the core comprises an electrochemically active material. As used herein, the term "electrochemically active material" refers to a material capable of acting as an electrode in a primary or secondary electrochemical cell, for example, in an ion battery system. According to some aspects, the electrochemically active material may comprise a material capable of acting as a cathode in a liquid type fluoride (F) shuttle battery.

According to some aspects, the electrochemically active material according to the present disclosure may be a lightweight material which provides high capacity and high energy densities. Examples of electrochemically active materials useful according to the present disclosure include, but are not limited to, metals such as copper (Cu), iron (Fe), lead (Pb), bismuth (Bi), cobalt (Co), tin (Sn), lanthanum (La), cerium (Ce), calcium (Ca), magnesium (Mg), lithium (Li), alloys thereof, oxides, fluorides thereof, and combinations thereof. According to some aspects, the electrochemically active material comprises copper, copper (II) fluoride ($CuF_2$), or a combination thereof.

According to some aspects, the electrochemically active material according to the present disclosure may be a lightweight material which provides high capacity and high energy densities. Examples of electrochemically active materials useful according to the present disclosure include, but are not limited to, metals such as copper (Cu), iron (Fe), lead (Pb), bismuth (Bi), cobalt (Co), tin (Sn), lanthanum (La), cerium (Ce), calcium (Ca), magnesium (Mg), lithium (Li), alloys thereof, oxides, fluorides thereof, and combinations thereof. According to some aspects, the electrochemically active material comprises copper, copper (II) fluoride ($CuF_2$), or a combination thereof.

According to some aspects, the core may have a selected shape. For example, the core may comprise a nanoparticle (e.g., a spherical nanoparticle), nanotube, nanowire, frame, flake, nanoporous sheet, thin film, foam, or a combination thereof. According to some aspects, the size of the core may be determined either by electron conductivity or $F^-$ ion mobility. In an illustrative example, 20 nm may be the distance limit of $F^-$ ion penetration in the core material. If the path of either an electron or $F^-$ ion is greater than this distance limit (in this example, 20 nm), electron conductivity and/or $F^-$ ion mobility will be reduced or prevented. As such, according to some aspects, the core may comprise at least one dimension that is less than or equal to about the distance limit. For example, the core may comprise a spherical nanoparticle having a diameter of less than or equal to about the distance limit, as such a spherical nanoparticle will provide a pathway for an electron or $F^-$ ion that is less than or equal to about the distance limit in all directions. It should be understood that the core may have one or more dimensions that are greater than about the distance limit so long as it has a pathway of about the distance limit or less in at least one direction. For example, the core may comprise a flake having dimensions in the X and Y directions of greater than about the distance limit and a dimension in the Z direction of less than or equal to about the distance limit. According to some aspects, the distance limit may be about 20 nm, optionally about 30 nm, optionally about 40 nm, and optionally about 50 nm. According to some aspects, the distance limit may be between about 20 and 80 nm, optionally between about 30 and 70 nm, and optionally between about 40 and 60 nm. According to some aspects, the distance limit corresponds at least in part to certain aspects of the electrochemically active structure, for example, its shell. In particular, a shell having a relatively low ionic resistance will provide for a longer distance limit as $F^-$ ions are more easily able to traverse the shell to the core.

Examples of cores useful according to the present disclosure include, but are not limited to, a nanoparticle with a diameter of less than or equal to about the distance limit, a nanowire with at least one dimension of less than or equal to about the distance limit, a nanotube having a wall thickness of less than or equal to about the distance limit, a flake (e.g., a triangle, rectangle, square, circle, or oval) having a thickness of less than or equal to about the distance limit, a film having a thickness of less than or equal to about the distance limit, a foam having a pore wall thickness of less than or equal to about the distance limit, a sheet having a thickness of less than or equal to about the distance limit, a frame having a thickness of less than or equal to about the distance limit, a mesh having a wire thickness of less than or equal to about the distance limit, and combinations thereof.

According to some aspects, the core can include at least one dimension that is less than or equal to about 40 nm, optionally less than or equal to about 35 nm, optionally less than or equal to about 30 nm, optionally less than or equal to about 25 nm, optionally less than or equal to about 20 nm, optionally less than or equal to about 15 nm, and optionally less than or equal to about 10 nm. In some embodiments, the core can include at least one dimension from about 1-25 nm, optionally from about 1-20 nm, optionally from about 1-15 nm, optionally from about 1-10 nm, optionally from about 1-10 nm, and optionally from about 1-5 nm.

The electrochemically active structure further comprises a shell that at least partially surrounds the core. For example, the shell may surround the core such that at least about 50% of the core's surface area is covered by the shell, optionally at least about 60%, optionally at least about 70%, optionally at least about 80%, optionally at least about 90%, optionally at least about 95%, and optionally at least about 100%. According to some aspects, the molecular coverage of the shell on the core may be between about 1 and 100 $nm^{-2}$, optionally between about 6 and 60 $nm^{-2}$.

In some embodiments, the shell at least partially surrounding the core includes a thickness, wherein the ratio of thickness between the thickness of the metal nanostructure core and the thickness of the shell layer is from about 10:1 to about 1:1, optionally from about 9:1 to about 2:1, optionally from about 8:1 to about 3:1, optionally from about 7:1 to about 4:1, and optionally from about 6:1 to about 5:1.

According to some aspects, the shell at least partially surrounding the core has a thickness from about 1 nm to about 10 nm, optionally from about 2 nm to about 9 nm, optionally from about 3 nm to about 8 nm, optionally from about 4 nm to about 7 nm, optionally from about 5 nm to about 6 nm, and optionally about 5 nm.

According to some aspects, the shell at least partially surrounding the core has a thickness about 1 nm to 1 micron, optionally no more than 500 nm, optionally no more than 200 nm, optional no more than 100 nm, optionally no more than 50 nm, no more than 10 nm, optionally about no more than 9 nm, optionally about no more than 8 nm, optionally about no more than 7 nm, optionally about no more than 6 nm, optionally about no more than 5 nm, optionally about no more than 4 nm, optionally about no more than 3 nm, optionally about no more than 2 nm, and optionally about no more than 1 nm. Further wherein all ranges can optionally be described as about 1-500 nm, 1-200 nm, 1-100 nm, 1-50 nm, 1-10 nm, 1-5 nm, and 1-2 nm.

According to some aspects, a metal nanostructure core capable of forming a metal fluoride having a theoretical capacity in a liquid electrolyte is provided, the metal nanostructure core including at least one lesser dimension, and a shell at least partially surrounding the core, the shell including a thickness, wherein the thickness of the shell and the lesser dimension of the nanostructure core are provided in a ratio wherein the capacity of the material in the liquid electrolyte is from about 5% to 90%, optionally about 10% to 75%, optionally about 15% to 60%, optionally about 20% to 50%, optionally about 25% to 45%, and optionally about 30% to 40%, of the theoretical capacity of the metal fluoride.

According to some aspects, the metal nanostructure core has a thickness of no more than 30 nm, optionally no more than 25 nm, optionally no more than 20 nm, optionally no more than 20 nm, optionally no more than 15 nm, optionally no more than 10 nm, optionally no more than 8 nm, optionally no more than 6 nm, and optionally no more than 5 nm.

According to some aspects, the shell may comprise a shell material that is compatible with a liquid type F-shuttle battery. For example, the shell material may be selected such that dissolution of the core material into the liquid electrolyte of the liquid type F-shuttle battery during charge and/or discharge may be reduced or eliminated. The shell material may be selected to further provide adequate charge time. As used herein, the term "charge time" refers to the length of time required for a discharged liquid type F-shuttle battery electrode to fully charge, that is, the length of time required for $F^-$ in the fluoride conducting electrolyte to travel from the anode to the cathode during the charge of the battery. According to some aspects, the charge time may be between about 1 and 20 minutes, optionally been about 1 and 10 minutes, and optionally between about 3 and 5 minutes.

According to some aspects, the shell material may be selected in order to acceptably utilize the electrochemically active material comprised by the core during charge and/or discharge. It should be understood that utilization refers to the portion of the electrochemically active material that accepts $F^-$ ions during charging and/or the portion of the electrochemically active material that is reduced during discharging. According to some aspects, by selecting a shell material having a relatively low ionic resistance as described herein, at least about 50% of the electrochemically active material may be utilized during charge and/or discharge, optionally at least about 60%, optionally at least about 70%, optionally at least about 80%, optionally at least about 90%, and optionally at least about 100%.

According to some aspects, the shell material may comprise a "soft shell" material. As used herein, "soft" refers to a material as described herein, and in particular, a material that includes at least one material capable of self-assembly as described herein. Examples of soft shell materials include, but are not limited to, surfactants, certain polymers, a non-surfactant molecule having one or more specific functional groups, and combinations thereof. According to some aspects, the shell material may comprise an organic material, and in particular, an organic material that includes at least one material capable of self-assembly as described herein. Examples of organic shell materials include, but are not limited to, organic soft shell materials such as organic surfactants, organic or organic molecule-containing polymers, non-surfactant organic molecules having one or more specific functional groups, and combinations thereof.

According to some aspects, the specific functional groups as described herein may be selected from the group consisting of —COOH, —NH$_2$, —COH, —OH, —SH, —PO$_3$H, —SO$_3$H, —CN, —NC, —R$_2$P, —COO$^-$, —COO—OOCR, ene-diol, —C≡N, —N≡N$^+$(BF$_4^-$), -Sac, —SR, —SSR, —CSSH, —S$_2$O$_3$—Na$^+$, —SeH, —SeSeR, —R$_2$P=O, —PO$_3^{2-}$/—P(O)(OH)$_2$, —PO$_4^{2-}$, —N≡C, —HC═CH$_2$, —C≡CH, —SiH$_3$, —SiCl$_3$, —OCH$_2$CH$_3$, formula (I), formula (II), formula (III), and combinations thereof, wherein formula (I) is:

formula (I)

formula (II) is:

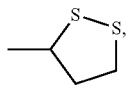

formula (II)

and formula (III) is:

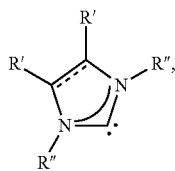

formula (III)

wherein R' and R" are each independently an organic chain, particularly an organic chain capable of being partially or fully fluorinated, or an aromatic group, either alone or in combination with another R' or R", particularly an aromatic group substituted with one or more fluorophilic groups. Example organic chains useful for R' and R" include, but are not limited to, —(CF$_2$)$_n$CF$_3$, (CH$_2$CF$_2$)$_n$CF$_3$, and (CF$_2$CH$_2$O)$_n$CF$_3$. Examples of functional groups according to formula (III) having at least one aromatic group are shown below as formula (IV):

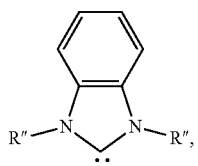

formula (IV)

and as formula (V):

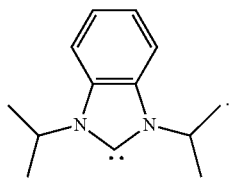

formula (V)

It should be understood that each R' and R" may be the same as another R' or R", or may be different. According to some aspects, each R' may show acceptable fluorination characteristics and/or each R" may show acceptable stabilization characteristics. It should further be understood that the carbon atom having the unshared valence electrons in the carbene shown in formula (III) may be configured for attachment to one or more molecules comprised by the core, as described herein. Example materials comprising a functional group having formula (III) include those described in Smith et al., "N-Heterocyclic Carbenes in Materials Chemistry." *Chem. Rev.*, 2019, 119, 4986-5056, which is incorporated herein by reference in its entirety.

According to some aspects, the surfactant may comprise a surfactant useful for preparing the core as described herein, such as a surfactant having one or more functional groups selected from the group consisting of a polar head (e.g., a polar head comprising one or more of the specific functional groups as described herein), a carbon-containing tail (e.g., alkanes, alkynes, alkenes, and aromatic rings), a fluorocarbon-containing tail (e.g., aliphatic chains such as (CF$_2$)$_n$, (CHF)$_n$, (CH$_2$CF$_2$)$_n$, and (CH$_2$OCH$_2$CF$_2$)$_n$, and/or aromatic groups such as (C$_{6-x}$F$_x$-)$_n$), and combinations thereof. Examples of surfactants useful according to the present disclosure may include, but are not limited to, oleylamine, oleic acid, tris(trimethylsilyl)silane, 3,3,4,4,5,5,6,6,7,7,8,8,9,9,10,10,10-heptadecafluorodecanethiol, 2-(trifluoromethoxy)-benzenethiol, P-[12-(2,3,4, 5,6-pentafluorophenoxy)dodecyl]-Phosphonic acid, P-(3,3,4,4,5,5,6,6,7,7,8,8,9,9,10,10, 10-heptadecafluorodecyl)-Phosphonic acid, pentafluorobenzylphosphonic acid, perfluorododecanoic acid and combinations thereof. According to some aspects, the surfactant may comprise one or more surfactants useful in the production of the core.

According to some aspects, the certain polymers may comprise polymers capable of being formed via in-situ polymerization, particularly polymers capable of being formed via in-situ polymerization from their monomers or from shorter oligomeric species. Additionally or alternatively, the certain polymers may be capable of self-healing through hydrogen bonding. For example, the certain polymers may be capable of hydrogen bonding so as to autonomously and repeatedly "self-heal" imperfections in the shell, such as cracks and/or gaps that may result at least in part from volume expansion and/or contraction of the core during charge and discharge, as will be discussed in more detail below in regard to FIG. 28. Examples of such polymers include, but are not limited to, polyvinylpyrrolidone (PVP), poly(methyl methacrylate) (PMMA), amino-terminated, C═O bond included cross linked polymers (P. Cordier, F. Toumilhac, C. Soulie-Ziakovic, L. Leibler, *Nature* 451, 977, (2008); B. C. Tee, C. Wang, R. Allen, Z. Bao, *Nat Nanotechnol* 7, 825, (2012)), and combinations thereof.

According to some aspects, the shell may comprise one or more monolayers. According to some aspects, the shell may comprise one, two, three, or more monolayers. According to some aspects, each of the monolayers may be the same or different.

According to some aspects of the present disclosure, the shell material may comprise inorganic materials, such as metal salts. Examples of the metal salts used to form the shell include alkali metal salts, alkaline earth metal salts, and transition metal salts. In certain embodiments, the metal salt used to form the shell includes lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride. In a non-limiting example, the shell comprises a metal fluoride or metal oxyfluoride containing material (i.e. CeF$_3$, CeOF, LaOF, LaF$_3$). In some embodiments, the shell of the core-shell nanoparticles may be formed by mixing isolated metal nanoparticles used to form the core with, for example, a metal salt solution and a halide salt solution that react to form the metal halide shell on the core.

In some embodiments, the metal salt solution comprises two metal salts. In some such embodiments, one of the two metal salts is a barium salt. In some embodiments, the metal salt solution comprises a barium salt and a lanthanum salt. In some embodiments, the metal salt solution comprises barium nitrate and lanthanum nitrate. In some embodiments, the metal salt solution comprises barium nitrate and lanthanum nitrate in a ratio of about 1:10.

I. Cu Nanoparticles Encapsulated in LaF$_3$ and Barium-Doped LaF$_3$ Shells

A method of making Cu nanoparticles encapsulated in LaF$_3$ or Barium-Doped LaF$_3$ shells has been disclosed in U.S. patent application Ser. No. 16/013,739 (published as U.S. Pat. Appl. Pub. No. 2018/0301764), which is incorporated herein by reference in its entirety.

Figure 3A:
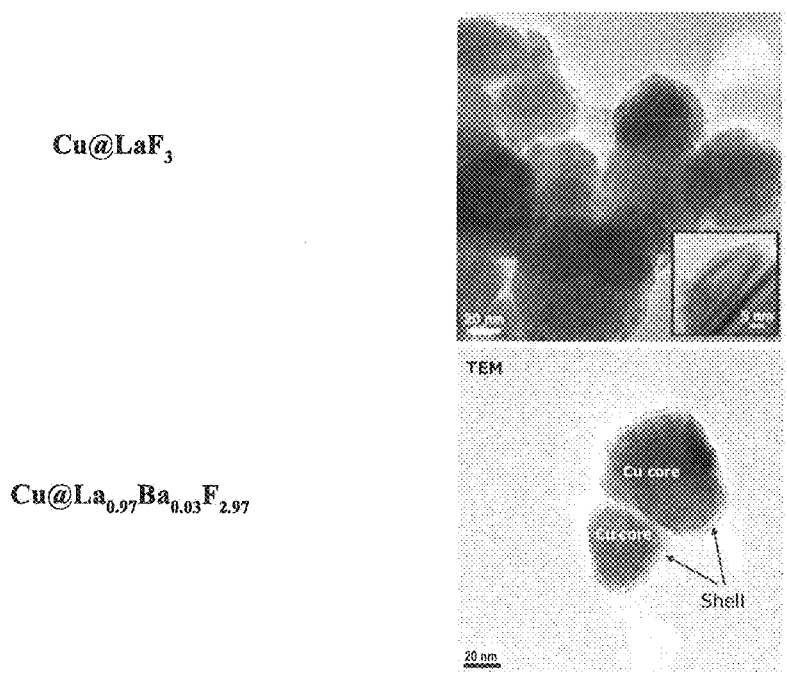
FIG. 3A depicts TEM images of Cu@$LaF_3$ core-shell nanoparticles and Cu@$La_{0.97}Ba_{0.03}F_{2.97}$ core-shell nanoparticles, respectively. The inset in the TEM image of Cu@$LaF_3$ nanoparticle is the zoom-in image of Cu (core) and $LaF_3$ (shell) areas.

FIG. 3A depicts TEM images of Cu@LaF$_3$ core-shell nanoparticles and Cu@La$_{0.97}$Ba$_{0.03}$F$_{2.97}$ core-shell nanoparticles, respectively. In FIG. 3A, the central black areas correspond to the copper core, and the peripheral black and white areas correspond to the LaF$_3$ or La$_{0.97}$Ba$_{0.03}$F$_{2.97}$ shells. The figure shows homogeneous coverage of the copper core directly coated with the LaF$_3$ or La$_{0.97}$Ba$_{0.03}$F$_{2.97}$ shells.

Figure 3B:
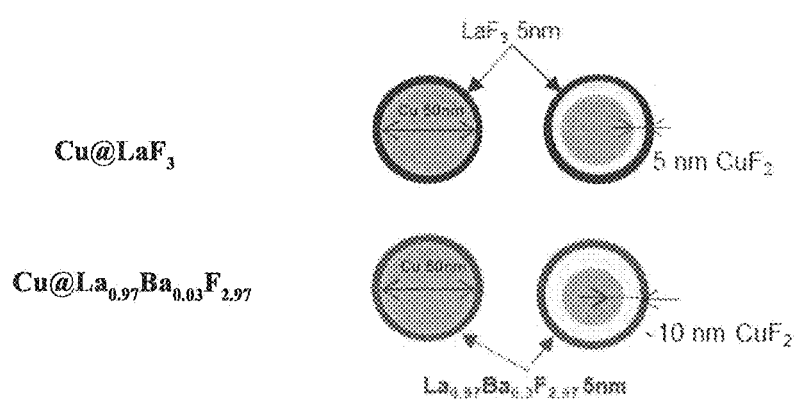
FIG. 3B shows schematic representations of Cu@$LaF_3$ and Cu@$La_{0.97}Ba_{0.03}F_{2.97}$ nanoparticles, respectively, according to some aspects of the present disclosure.

Core-shell nanoparticles with shells of the formula Cu@La$_{0.97}$Ba$_{0.03}$F$_{2.97}$ are shown schematically in FIG. 3B; Cu@LaF$_3$ is included for comparison. Initially, the copper nanoparticle core may be up to about 50 nm in diameter before use and the LaF$_3$ or La$_{0.97}$Ba$_{0.03}$F$_{2.97}$ coating may be about 5 nm thick. The CuF$_2$ layer that forms around the Cu core during battery charging can grow to a thickness of about 3 nm in Cu@LaF$_3$ nanoparticles. However, by doping Ba into the LaF$_3$ shell, the CuF$_2$ layer can grow to a greater thickness, e.g. around 10 nm in FIG. 3B.

Figure 4A:
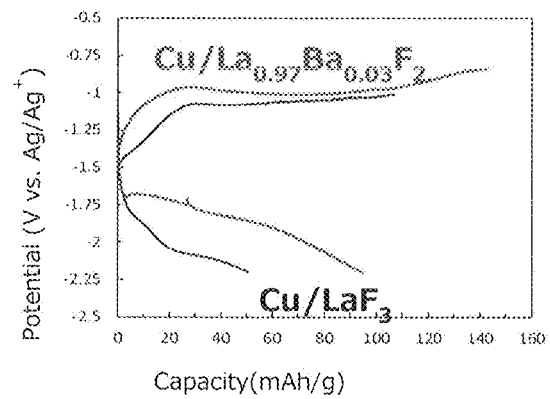
FIG. 4A shows the voltage profile of the first charge-discharge cycle of a Cu@$LaF_3$ electrode or a Cu@$La_{0.97}Ba_{0.03}F_{2.97}$ electrode, compared to the Ag/$Ag^+$ reference electrode, according to some aspects of the present disclosure.
Figure 4B:
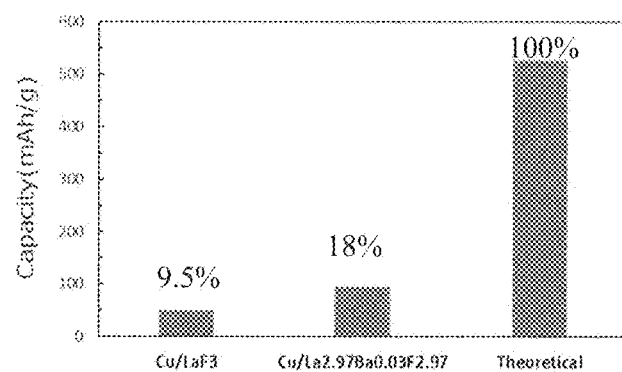
FIG. 4B shows a comparison of the capacity achieved for Cu@$LaF_3$ (9.5% of theoretical capacity), for Cu@$La_{0.97}Ba_{0.03}F_{2.97}$ (18% of theoretical capacity), and for $CuF_2$ (theoretical capacity of 528 mAh/g) according to some aspects of the present disclosure.

FIGS. 4A and 4B demonstrate the capacity improvement achieved upon Ba-doping. FIG. 4A shows the voltage profile of the first charge-discharge cycle of a Cu@LaF$_3$ electrode or a Cu@La$_{0.97}$Ba$_{0.03}$F$_{2.97}$ electrode, compared to the Ag/Ag$^+$ reference electrode. The capacity delivery of the Ba-doped electrode (Cu@La$_{0.97}$Ba$_{0.03}$F$_{2.97}$) reaches 95.2 mAh/g compared to only 50.2 mAh/g for Cu@LaF$_3$ (FIG. 4B). Thus, Ba-doping of the LaF$_3$ shell nearly doubles the capacity of cathodic electrode. With Ba doping, the ionic conductivity of the LaF$_3$ shell is improved about 100 times; see, e.g., M. Anji Reddy and M. Fichtner, Batteries based on fluoride shuttle, *J. Mater. Chem.* 2011, 21, 17059-17062, which is incorporated herein by reference in its entirety. Fluoride ion can more readily travel through the shell to react with Cu to form CuF$_2$, and the amount of CuF$_2$ formation directly determines the capacity of the battery. The more CuF$_2$ that is formed, the higher the capacity of the battery. Therefore, the utilization of Cu can be nearly doubled by Ba-doping of the LaF$_3$ shell.

Figure 5:
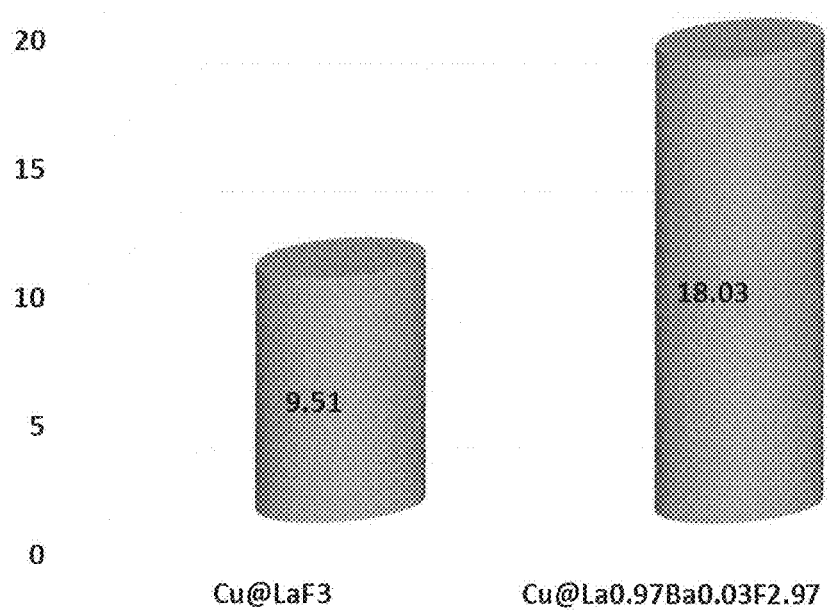
FIG. 5 shows the percentage of energy densities achieved by copper based F-shuttle batteries, which is normalized by theoretical capacity of $CuF_2$ (528 mAh/g).

Cu or CuF$_2$ is useful as a cathode material for liquid type F-shuttle batteries. These materials are relatively inexpensive and are light weight, which provides a high capacity and a high energy density. Theoretical capacity of CuF$_2$ is 528 mAh/g. However, pure Cu or CuF$_2$ is easily dissolved into liquid electrolytes during charge and discharge. To solve this issue, a Cu core is coated with LaF$_3$ or Ba doped LaF$_3$ shell structures, which effectively prevents Cu from dissolution during charge/discharge cycling. For Cu@LaF$_3$, for example, the LaF$_3$ shell effectively prevents Cu from dissolution during charge/discharge. As a result, Cu can be converted to CuF$_2$ during charge, and CuF$_2$ can be reduced to Cu during discharge. With a Ba-doped shell (e.g., La$_{0.97}$Ba$_{0.03}$F$_{2.97}$), the ionic conductivity of the shell can be improved 100 times compared to that of a LaF$_3$ shell, i.e., the shell has low resistance. F$^-$ ions more easily pass through the shell so that more Cu can be fluorinated to CuF$_2$ during charge. Capacity is doubled compared to the undoped LaF$_3$ shell. (See FIGS. 4A and 4B and FIG. 5).

II. Designs of Cu Nanostructures

Due to poor electrical and ionic conductivities of many metal fluorides, it is necessary to design the structures of the metal fluorides to fully utilize the active materials and achieve their specific capacities and energy densities.

In one embodiment, for better utilization of the Cu/CuF$_2$ electrode materials to achieve an energy density close to its theoretical capacity (i.e. 843.5 mAh/g for Cu and 528 mAh/g for CuF$_2$), structural designs tailored to satisfy the requirement of no more than 20 nm thickness of Cu nanomaterials along at least one direction or one axis of the Cu nanostructure are preferred. Among these structures, Cu may be the active material having a LaF$_3$ or Ba$_x$La$_{1-x}$F$_{3-x}$ coating/coverage in the range of ~5-20 nm.

Examples of such Cu nanostructures include: nanoparticles, nanotubes, nanowires, nanoframes, nanoflakes, nano porous, sheets, thin films and the like. According to some aspects, such Cu nanostructures can comprise Cu thin films with a thickness no more than 20 nm. In some embodiments, such Cu nanostructures can comprise Cu Nanofoams With A Porous Wall Having A Thickness No More Than 20 nm. In some embodiments, such Cu nanostructures can comprise Cu mesh with a wire having a thickness no more than 20 nm.

(i) Cu Nanoparticles ("NP").

Figure 6:
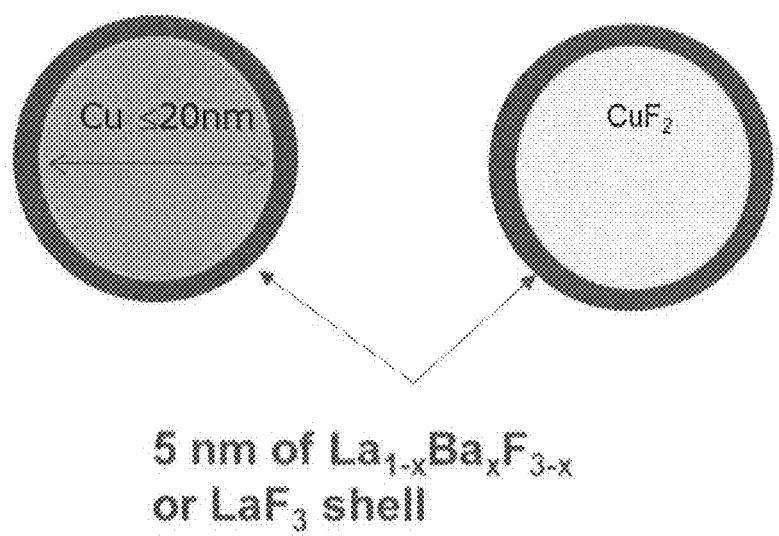
FIG. 6 illustrates the structure of Cu and fluorinated Cu ($CuF_2$) nanoparticles.

A structural design of Cu core nanoparticles is illustrated in FIG. 6 where the Cu core nanoparticles have a diameter no more than 20 nm and a LaF$_3$ or Ba$_x$La$_{1-x}$F$_{3-x}$ coating/shell. In FIG. 6, in any direction, the thickness/diameter of Cu core nanoparticles is no more than 20 nm due to their spherical shape.

Example 1. Synthesis of 6 nm Cu Nanoparticles ("NP")

Figure 7:
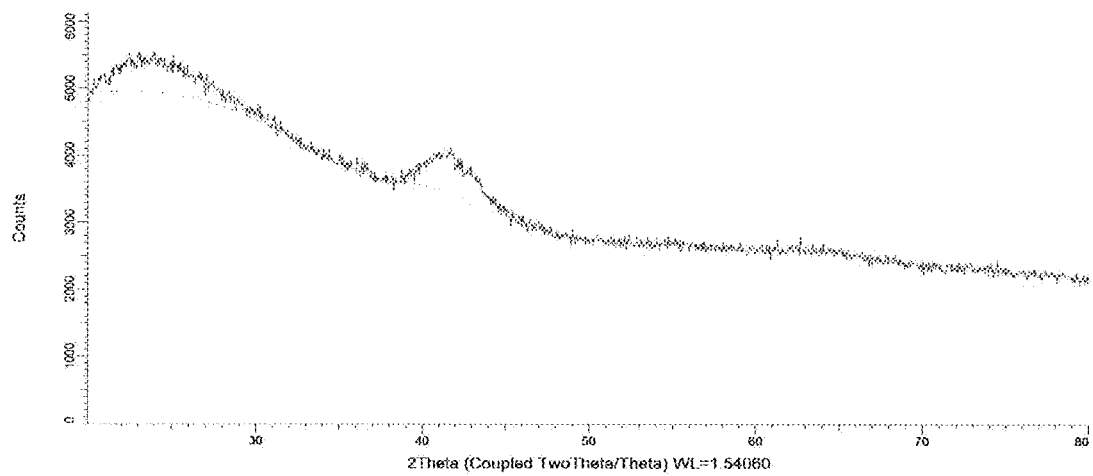
FIG. 7 shows XRD spectra of 6 nm Cu nanoparticles.

NH$_4$OH (0.5 mL, 14.5 M) was added to a stirring solution of CuCl$_2$.2H$_2$O (0.24 g, 1.4 mmol) and cetrimonium bromide (CTAB, 0.68 g, 1.87 mmol) in water (93 mL, DI) in an argon atmosphere at 23° C. Hydrazine hydrate (50-60%, 3 mL, 17.66 M) was added to a solution of CTAB (0.68 g, 1.87 mmol) and citric acid monohydrate (0.036 g, 0.18 mmol) in water (57 mL, DI). The hydrazine solution was immediately transferred to a 60 mL syringe and added over 5 minutes via a syringe pump to the Cu precursor solution. Once the addition of the hydrazine solution was complete the argon line was removed and the reaction was stirred open to air. Once exposed to air a solution of citric acid monohydrate (0.21 g, 1.0 mmol) in water (5 mL) was injected all at once. The mixture was then stirred for 1 hour, open to air. The Cu NP were isolated via centrifuge (12,000 rpm for 5 min.), the supernatant was discarded and the Cu NP were washed with EtOH (10 mL) twice. The product exhibited small, broad Cu peaks by XRD. See FIG. 7.

Example 2. Synthesis of 6 nm Cu Nanoparticle Shell

Figure 8:
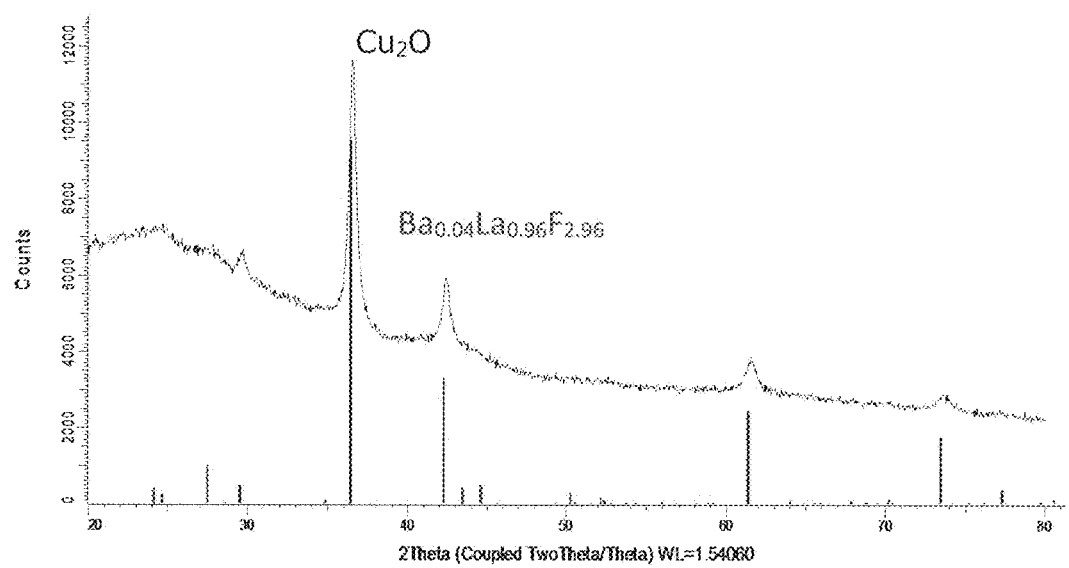
FIG. 8 shows XRD spectra of 6 nm Cu@$LaF_3$ after initial synthesis.
Figure 9A:
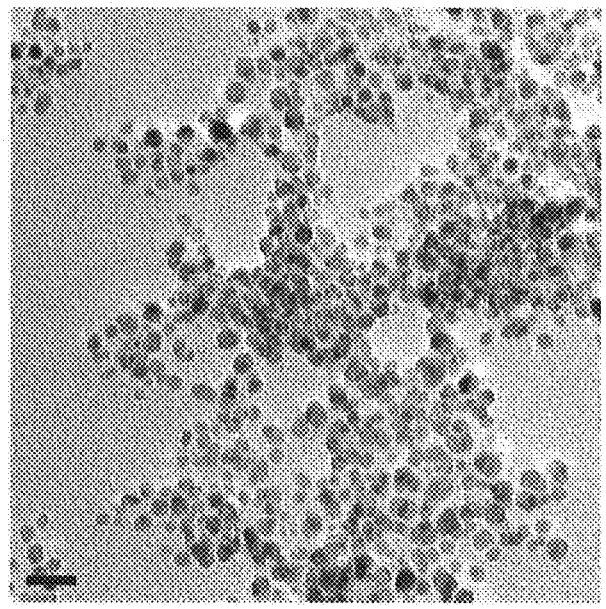
FIG. 9A illustrates a TEM image of 6 nm Cu core nanoparticles after initial synthesis.
Figure 9B:
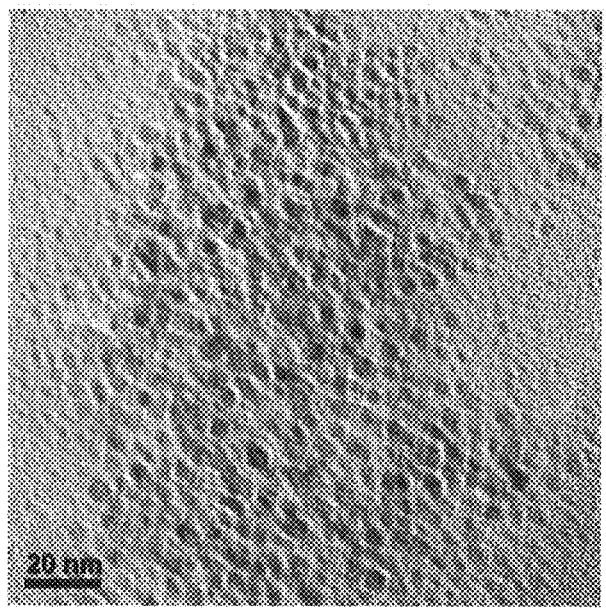
FIG. 9B shows a TEM image of 6 nm Cu core with a $LaF_3$ shell after initial synthesis.

The Cu NP (6 nm) obtained in Example 1 was isolated and washed once with water (20 mL). The Cu NP was re-dispersed in water (300 mL) and a solution of La(NO$_3$)$_3$ 6H$_2$O (0.43 g, 1.0 mmol) in water (60 mL) was added and the mixture was stirred (60 min.) in an argon atmosphere. The sample was isolated (12,000 rpm for 10 min) and re-dispersed in water (300 mL). To the stirring solution NaF (0.042 g, 1.0 mmol) in water (60 mL) was injected at 6 mL/min then stirred (60 min.) in an argon atmosphere. The sample was isolated via centrifuge (12,000 rpm for 10 min) and washed twice with EtOH (20 mL). XRD showed complete oxidation of the Cu core sample to Cu$_2$O with a LaF$_3$ shell. See FIG. 8. The TEM images of 6 nm Cu core NP and 6 nm Cu core NP with a LaF$_3$ shell are depicted in FIGS. 9A and 9B, respectively.

Example 3. Reduction of Cu$_2$O to Cu in 6 nm Cu Core NP with A LaF$_3$ Shell

Figure 10:
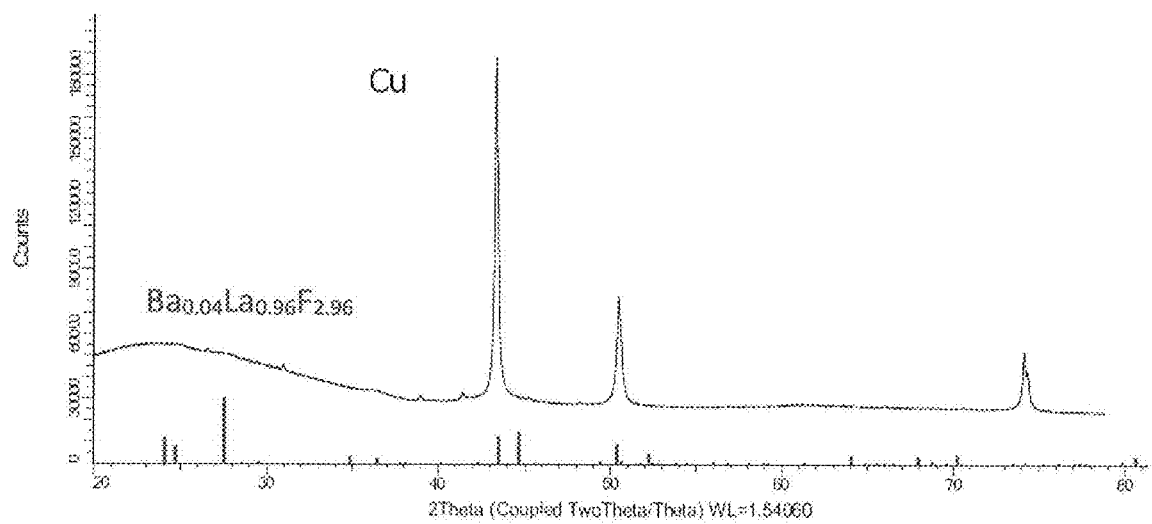
FIG. 10 shows XRD spectra of 6 nm Cu core NP with a $LaF_3$ shell after reduction of $Cu_2O$.

The Cu$_2$O in the core nanoparticles obtained in Example 2 was effectively reduced to Cu by a mixture of H$_2$ and N$_2$ gases under heat treatment of 300° C. for six hours. The particle size of Cu NP increased during the reduction reaction. XRD spectra of 6 nm Cu core NP with a LaF$_3$ shell after reduction reaction is shown in FIG. 10.

(ii) Cu Nanowires ("NW") Encapsulated in LaF$_3$ or Ba-Doped LaF$_3$ Shells ("Hard Shells").

Figure 11:
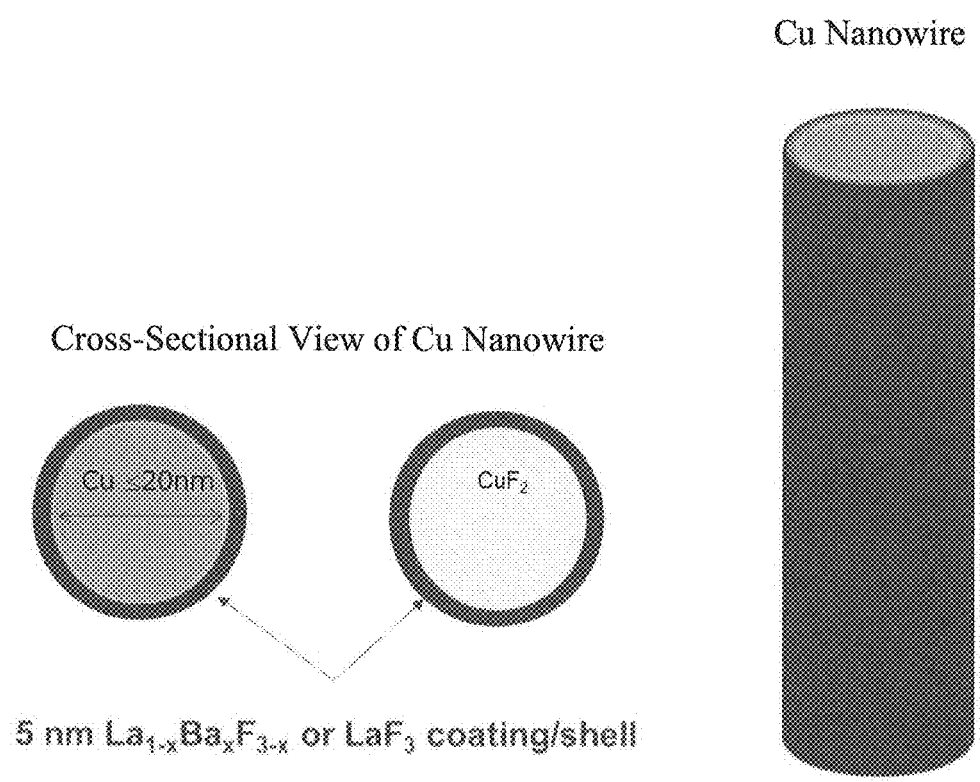
FIG. 11 illustrates the structure of Cu nanowires with a $La_{1-x}Ba_xF_{3-x}$ or $LaF_3$ coating and a cross-sectional view of the Cu nanowires.

The structural design of Cu core nanowires is illustrated in FIG. 11 where the Cu nanowires have a cross-sectional diameter no more than 20 nm and a LaF$_3$ or Ba$_x$La$_{1-x}$F$_{3-x}$ coating. In FIG. 11, the cross-sectional diameter of Cu core in the nanowire is no more than 20 nm and the thickness of La$_{1-x}$Ba$_x$F$_{3-x}$/LaF$_3$ shell/coating is about 5 nm.

Example 4. Two Phase Shell Formation on Cu Nanowires

About 20 mg of Cu nanowires were re-dispersed in 50 ml toluene. A first portion of tetrabutylammonium bromide (0.322 g, 1.0 mmol) was added into the Cu nanowires toluene suspension. A solution of La(NO$_3$)$_3$ 6H$_2$O (0.866 g, 2.0 mmol) in water (50 mL) was injected at 5 mL/min into the toluene suspension. This mixture was stirred very rapidly for 2 hours. The water layer was removed via a separatory funnel and a second portion of tetrabutylammonium bromide (0.322 g, 1.0 mmol) was added to the toluene layer. A solution of NaF (0.084 g, 2.0 mmol) in water (50 mL) was injected at 5 mL/min into the stirring toluene suspension. This mixture was stirred very rapidly for additional 2 hours. The water layer was removed via separatory funnel and ethanol (20 mL) was added to distribute the product. The product was isolated via centrifuge (12,000 rpm for 10 min) then washed twice with EtOH (20 mL).

As set forth above, the two phase shell formation method can be applied to nanowires. However, the applications of the same coating method is not limited to nanowires or relevant applications. Even further the core material is not limited to copper. In one example, The coated structures may be used as a cathode material in a Fluoride Shuttle battery. In another example, the Fluoride Shuttle battery comprises a liquid electrolyte.

Figure 14:
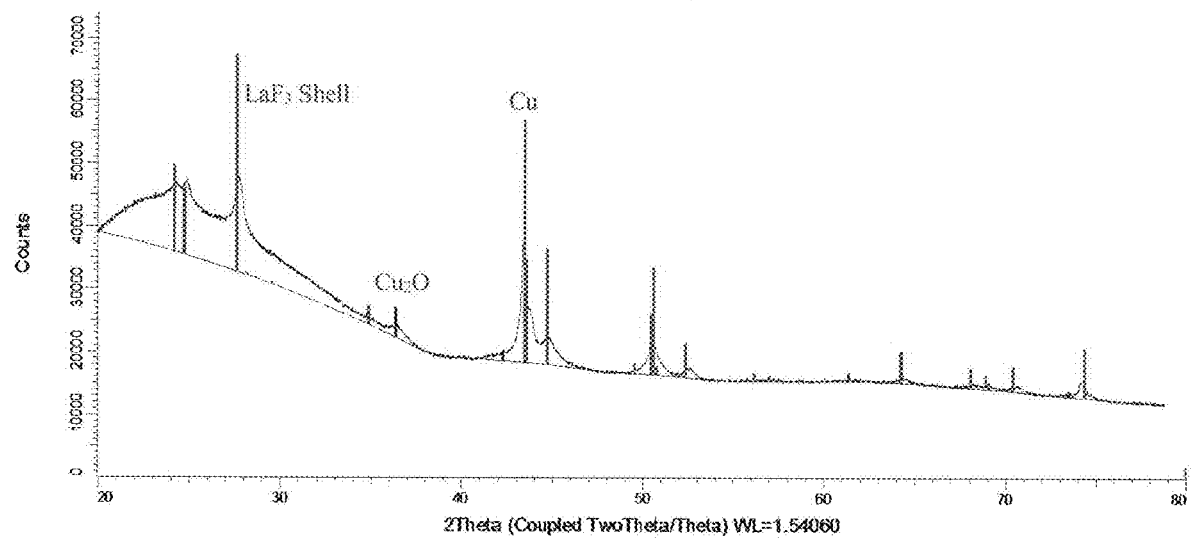
FIG. 14 shows the XRD spectra of Cu nanowires (with a diameter about or less than 20 nm), small amount of $Cu_2O$ after shell formation, and $LaF_3$ shell of Cu nanowires, according to some aspects of the present disclosure.

The XRD spectra of Cu nanowires, a small amount of Cu$_2$O after shell formation, and the LaF$_3$ shell of Cu nanowires are depicted in FIG. 14. FIGS. 15A and 15B delineate SEM images of Cu nanowires prior to and after two phase LaF$_3$ shell formation, respectively. TEM images with different magnifications in FIGS. 16A, 16B, and 16C show the formation of LaF$_3$ shells around Cu nanowires. In the images, the grey areas surrounding the Cu nanowires are the LaF$_3$ shells.

Figure 17:
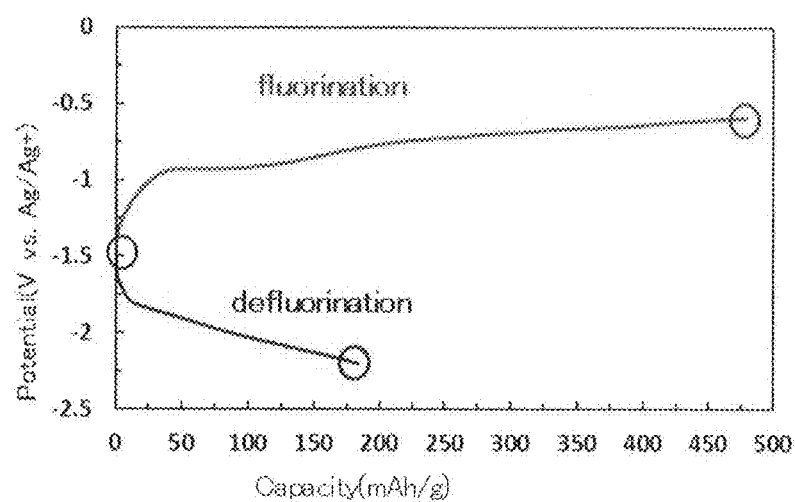
FIG. 17 shows the voltage profile of the charge-discharge cycle of an electrode made of Cu nanowires encapsulated in $LaF_3$ shells (CuNW@$LaF_3$), according to some aspects of the present disclosure.

FIG. 17 shows the voltage profile of the charge-discharge cycle of an electrode made of Cu nanowires encapsulated in LaF$_3$ shells (CuNW@LaF$_3$) compared to the Ag/Ag$^+$ reference electrode. The capacity delivery of electrode made of CuNW encapsulated in LaF$_3$ shells reaches 183 mAh/g compared to 95.2 mAh/g for Cu@Ba$_x$La$_{1-x}$F$_{3-x}$ and 50.2 mAh/g for Cu@LaF$_3$, respectively. Thus, the electrode made of Cu nanowires encapsulated in LaF$_3$ shells nearly doubles the capacity of Cu@Ba$_x$La$_{1-x}$F$_{3-x}$ and nearly has four times the capacity of Cu@LaF$_3$. Without wishing to be bound to any particular theory, it is believed that the amount of CuF$_2$ formation directly determines the capacity of the battery. The more CuF$_2$ that is formed, the higher the capacity of the battery can be achieved. Therefore, the utilization of Cu can be significantly increased by Cu nanowires coupled with LaF$_3$ encapsulation. In one embodiment, CuNW@LaF$_3$ can reach about 35% of theoretical capacity of CuF$_2$, whereas Cu@Ba$_x$La$_{1-x}$F$_{3-x}$ and Cu@LaF$_3$ can reach about 18% and 9.5% of the theoretical capacity of CuF$_2$, respectively.

Figure 18:
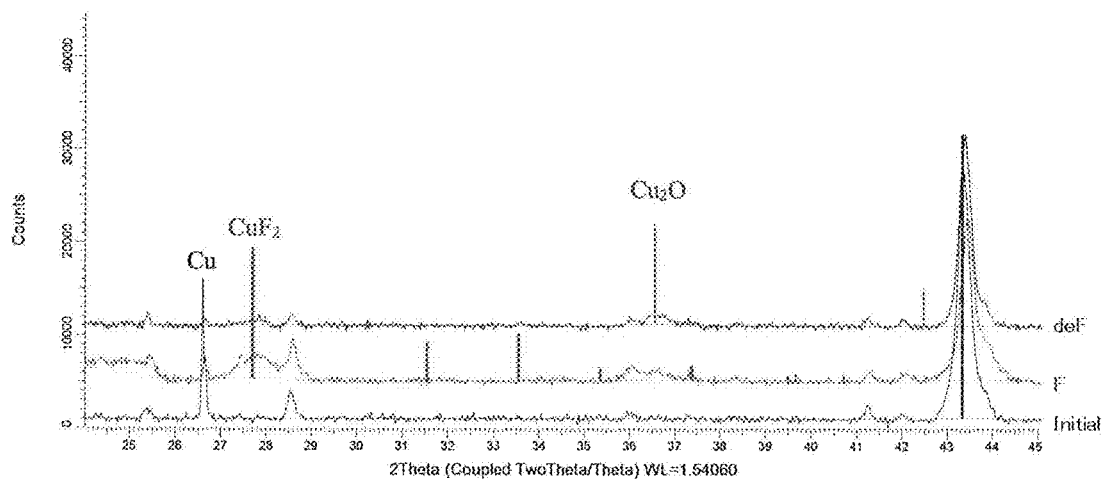
FIG. 18 shows the XRD spectra of CuNW@$LaF_3$ in initial condition, after a charge (fluorination, 'F'), and a subsequent discharge (defluorination, 'deF'), according to some aspects of the present disclosure.

In addition, FIG. 18 shows the XRD spectra of CuNW@LaF$_3$ in initial condition, i.e., in an electrode before a use, and then after a charge (fluorination) and a subsequent discharge (defluorination), respectively. CuF$_2$ can be formed after charge and then reduced to Cu after discharge. FIG. 18 indicates that Cu in the form of nanowires coupled with LaF$_3$ shells can be cycled in liquid electrolytes.

(iii) Cu Nanotubes.

Figure 21:
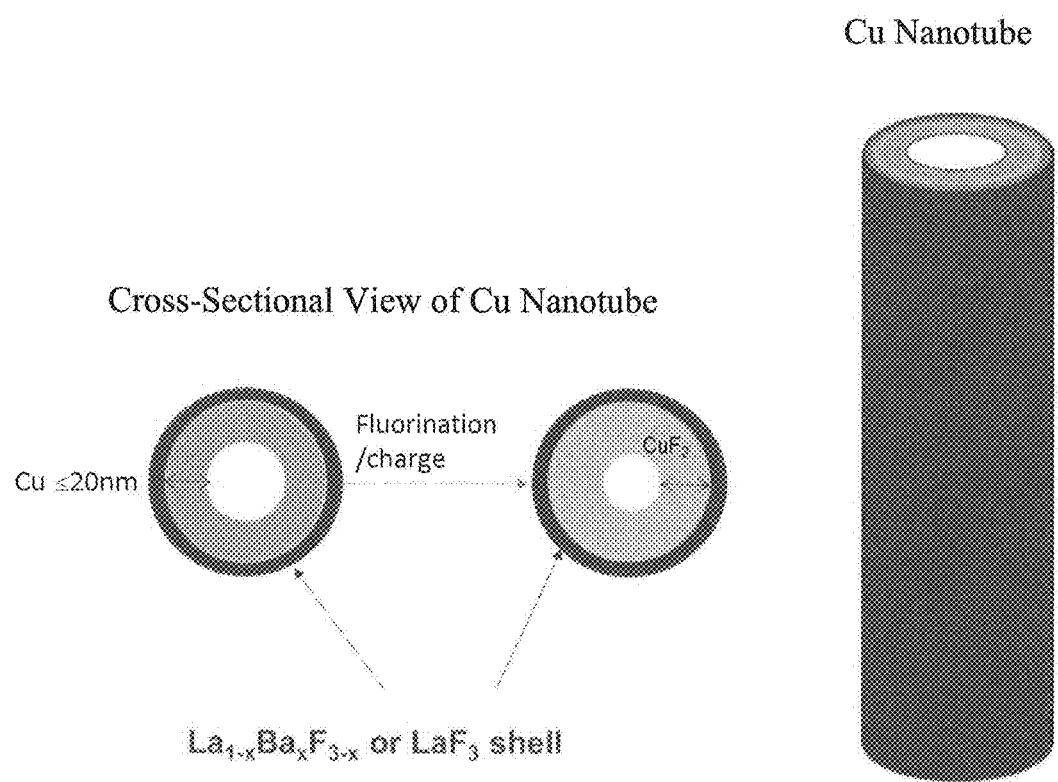
FIG. 21 illustrates the structure of Cu nanotubes with a $La_{1-x}Ba_xF_{3-x}$ or $LaF_3$ coating and a cross-sectional view of the Cu nanotubes.

The structural design of Cu nanotubes is illustrated in FIG. 21 where the Cu nanotubes have a Cu inner wall with a cross-sectional thickness of no more than 20 nm and a LaF$_3$ or Ba$_x$La$_{1-x}$F$_{3-x}$ coating layer. In FIG. 21, the cross-sectional thickness of Cu inner wall of nanotubes is no more than 20 nm.

(iv) Cu Nanoflakes.

Figure 22:
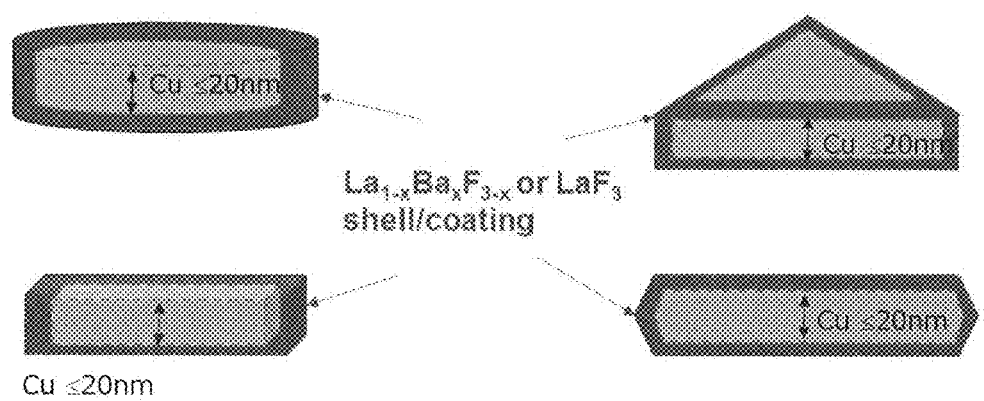
FIG. 22 illustrates the structure of Cu nanoflakes and Cu nanosheets with a $La_{1-x}Ba_xF_{3-x}$ or $LaF_3$ coating. The minimum thickness of these structures is no more than 20 nm.

Cu flakes may take many shapes, such as triangle, rectangle, square, circle, oval etc. The structure of Cu nanoflakes is illustrated in FIG. 22 where the Cu nanoflakes have a minimum thickness of no more than 20 nm and a LaF$_3$ or Ba$_x$La$_{1-x}$F$_{3-x}$ coating. In FIG. 22, at least along one direction or one axis, the thickness of the Cu nanoflakes is no more than 20 nm.

(v) Cu Nanoframes.

Figure 23:
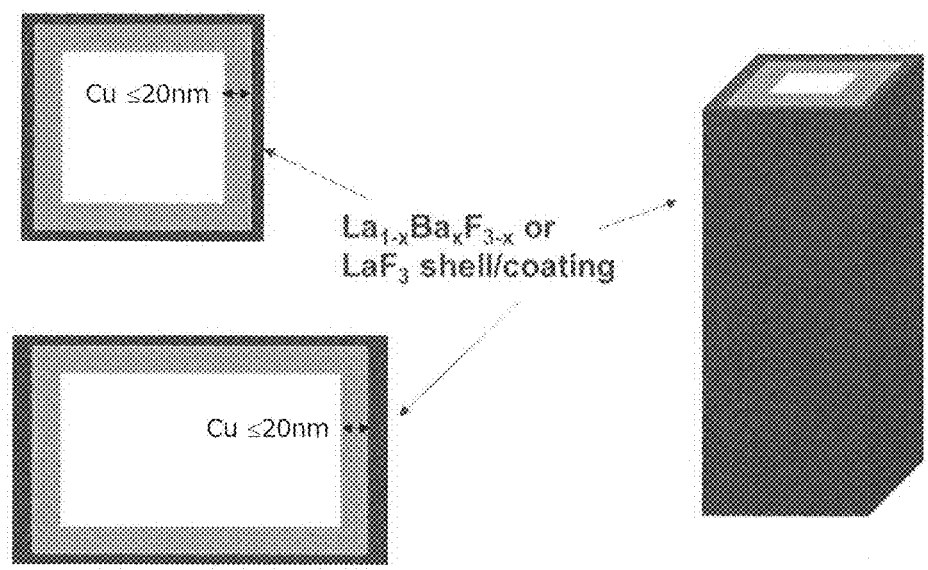
FIG. 23 illustrates the structure of Cu nanoframes with a $La_{1-x}Ba_xF_{3-x}$ or $LaF_3$ coating. An inner copper wall within the Cu nanoframe has a thickness no more than 20 nm.

The structural design of Cu nanoflakes is illustrated in FIG. 23 where the Cu nanoframes have an inner layer of Cu with a thickness no more than 20 nm. In FIG. 23, the inner copper wall within the Cu nanoframe has a thickness no more than 20 nm.

(vi) Cu Nanosheets with a Thickness No More than 20 nm.

The structural design of Cu nanosheets is illustrated in FIG. 22 where the shortest direction of the Cu nanosheets has a thickness no more than 20 nm. In FIG. 22, the shortest direction of Cu nanosheets has a thickness no more than 20 nm.

III. Other Metal Materials Suitable for Making Nanostructures.

In the present disclosure, the metal nanostructures suitable for making cathodic electrode is not limited to copper. As shown in FIG. 1C, transition metals and any salts thereof can be used to prepare the nanostructures encapsulated in various coating layers as disclosed in the previous section. Suitable transition metal comprises metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

IV. Electrochemically Active Structure Encapsulated in Self-Assembled Shell ("Soft Shell")

Figure 27A:
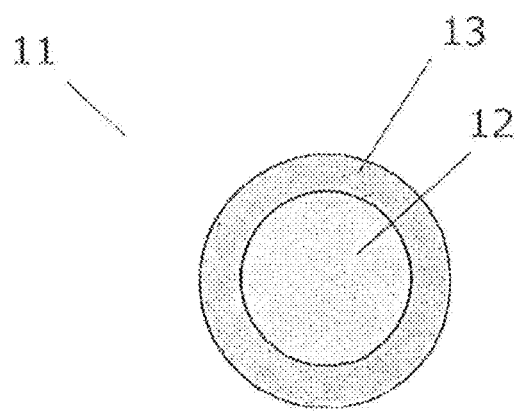
FIG. 27A shows an example electrochemically active structure according to aspects of the present disclosure.

FIG. 27A shows an example electrochemically active structure 11 according to aspects of the present disclosure. As show in FIG. 27A, the electrochemically active structure 11 may comprise a core 12 as described herein and a monolayer 13 comprising a shell material as described herein. According to some aspects, the monolayer 13 may be, for example, a self-assembled monolayer (SAM) comprising a surfactant as described herein. It should be understood that in this example, monolayer 13 corresponds to the shell as described herein.

Figure 27B:
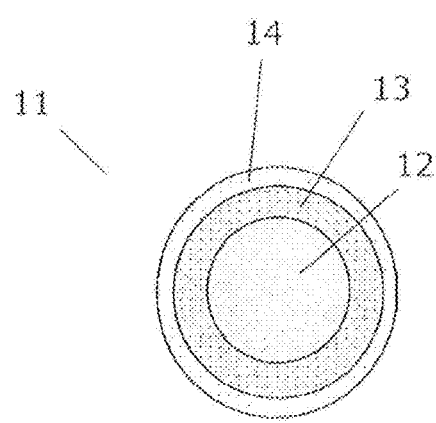
FIG. 27B shows an example electrochemically active structure according to aspects of the present disclosure

FIG. 27B shows an example electrochemically active structure 11 comprising a core 12 as described herein and a monolayer 13 comprising a shell material as described herein. FIG. 27B also shows a second monolayer 14 covering at least a portion of the first monolayer 13. The second monolayer 14 may also be a SAM that is either the same or different from the first monolayer 13. It should be understood that in this example, the first monolayer 13 and the second monolayer 14 may together correspond to the shell as described herein. Furthermore, the first and second monolayers can be self-assembled.

Figure 27C:
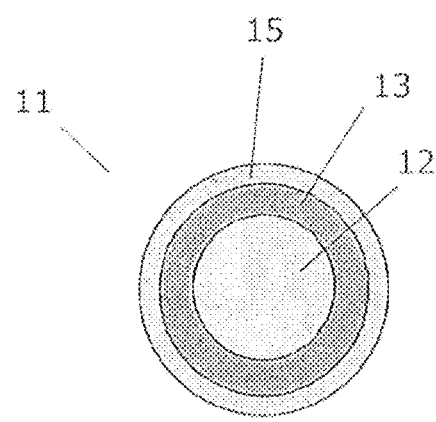
FIG. 27C shows an example electrochemically active structure according to aspects of the present disclosure.

FIG. 27C shows an example electrochemically active structure 11 comprising a core 12 as described herein and a monolayer 13 comprising a shell material as described herein. FIG. 27C also shows a polymer layer 15 covering at least a portion of the monolayer 13. The polymer layer 15 may comprise any of the polymers as described herein. It should be understood that in this example, the monolayer 13 and the polymer layer 15 may together correspond to the shell as described herein.

It should be understood that while FIGS. 27A-C show certain example shell configurations, the electrochemically active structure may comprise a shell having a different configuration. For example, the shell may comprise more than two SAMs and/or more than one polymer layer, wherein the position of the SAMs and/or polymer layer are in any arrangement with respect to each other.

Figure 28:
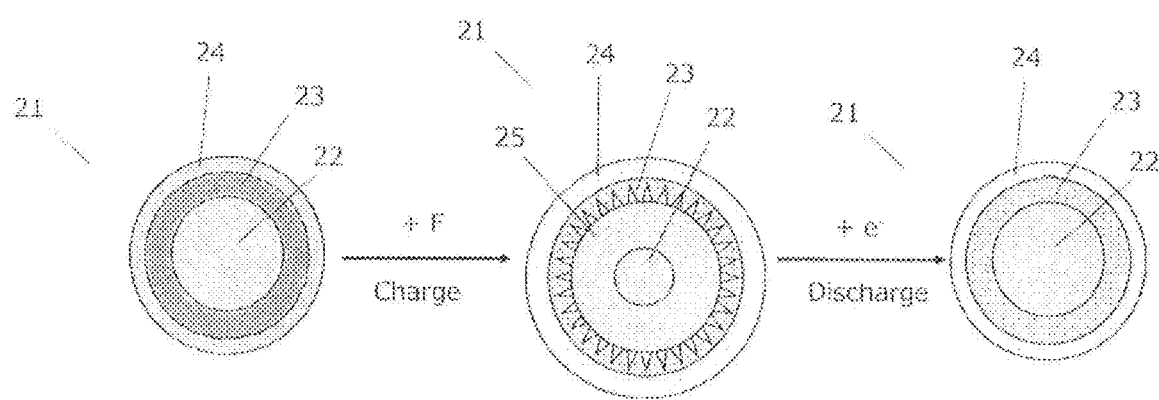
FIG. 28 shows an example schematic of charging and discharging an electrochemically active structure according to aspects of the present disclosure.

According to some aspects, the shell may be configured to accommodate the volume change of the electrochemically active material between charged and discharged states. For example, FIG. 28 shows an example schematic of charging and discharging an electrochemically active structure 21 as described herein. As shown in FIG. 28, the electrochemically active structure 21 may comprise a core 22 and a shell comprising a SAM 23 and a polymer layer 24 as described herein. The core may comprise any core as described herein, for example, a Cu core. FIG. 28 shows a schematic of charging the electrochemically active structure 21, e.g., when $F^-$ ions travel to a cathode comprising the electrochemically active structure 21. As shown in FIG. 28, $F^-$ ions are able to traverse the shell to the core 22 such that at least a portion of the Cu core 22 is converted to $CuF_2$ 25. As the Cu in the Cu core 22 is converted to $CuF_2$ 25, the volume of the core may expand. Without wishing to be bound by theory, as the volume of the core expands, SAM 23 may defect or crack, thereby accommodating the change in volume. As shown in FIG. 28, as the electrochemically active structure 21 is discharged, the $CuF_2$ 25 may be reduced back to Cu 22, and the volume of the core may contract. As the volume contracts, the SAM 23 may self-assemble or "self-heal" to its original configuration.

FIGS. 16A-16C show an example transmission electron microscope (TEM) image of an electrochemically active structure according to aspects of the present disclosure. In particular, FIG. 16A shows a nanowire having a shell as described herein.

V. Cu Nanowire (CuNW) Encapsulated in Surfactant Shells ("Soft Shells")

Cu nanowires can be encapsulated in surfactant soft shells. The soft shells comprises at least one organic surfactant. Suitable organic surfactants comprise one or more specific functional group, which may be selected from the group consisting of —COOH, —$NH_2$, —COH, —OH, —SH, —$PO_3H$, —$SO_3H$, —CN, —NC, —$R_2P$, —$COO^-$, —COO—OOCR, ene-diol, —C≡N, —N≡$N^+(BF_4^-)$, -Sac, —SR, —SSR, —CSSH, —$S_2O_3^-Na^+$, —SeH, —SeSeR, —$R_2P$=O, —$PO_3^{2-}$/—$P(O)(OH)_2$, —$PO_4^{2-}$, —N≡C, —HC=$CH_2$, —C≡CH, —$SiH_3$, —$SiCl_3$, —$OCH_2CH_3$, formula (I), formula (II), formula (III), an alkane, an alkyne, an alkene, an aromatic ring, and combinations therefore, wherein formula (I) is:

formula (I)

formula (II) is:

formula (II)

and formula (III) is:

formula (III)

wherein R' and R" are each independently an organic chain or an aromatic group, either alone or in combination with another R' or R". Examples of suitable surfactants include oleylamine, oleic acid, tris(trimethylsilyl)silane, 3,3,4,4,5,5,6,6,7,7,8,8,9,9,10,10, 10-heptadecafluorodecanethiol, 2-(trifluoromethoxy)-benzenethiol, P-[12-(2,3,4,5,6-pentafluorophenoxy)dodecyl]-Phosphonic acid, P-(3,3,4,4,5,5,6,6,7,7,8,8,9,9,10,10,10-heptadecafluorodecyl)-Phosphonic acid, pentafluorobenzylphosphonic acid, perfluorododecanoic acid and combinations thereof. More specifically, the suitable surfactants are selected from oleylamine, oleic acid, tris(trimethylsilyl)silane, or a combination thereof. The structure of CuNW@soft shell is similar as that of FIG. 11, except that the shell layer is made of surfactants.

According to some aspects, the surfactant soft shells can comprise organic or organic molecule-containing polymers forming polymer shells; the structure of CuNW@soft shell comprising polymers is similar to that of FIG. 27A, except that the surfactant soft shell 13 comprises polymer. According to some aspects, the surfactant soft shells can comprise polymer shells as described for the "IV. Electrochemically Active Structure Encapsulated in Self-Assembled Shell" above. The structure of CuNW@soft shell with polymer shells is similar to that of FIGS. 27B, 27C, and 28 except that a CuNW is at the core, the shell layer is made of surfactants, while the polymer layer may comprise any of the polymers as described herein. According to some aspects, FIG. 27C can represent a cross-section of a CuNW, and the monolayer 13 and the polymer layer 15 may together correspond to the shell as described herein. According to some aspects in FIG. 27C, the monolayer 13 and the polymer layer 15 may correspond to a surfactant shell and a polymer shell, respectfully. It should be understood that while FIG. 27C shows certain example shell configurations as described for CuNW, the shell may comprise a different configuration. For example, the shell may comprise a surfactant shell and a polymer shell in different arrangements. For example, the shell may comprise more than one surfactant shell and more than one polymer shell, wherein the position of the surfactant shell and the polymer shell are in any arrangement with respect to each other.

Example 5. Preparation of CuNW Encapsulated in Surfactant Shells

Figure 12:
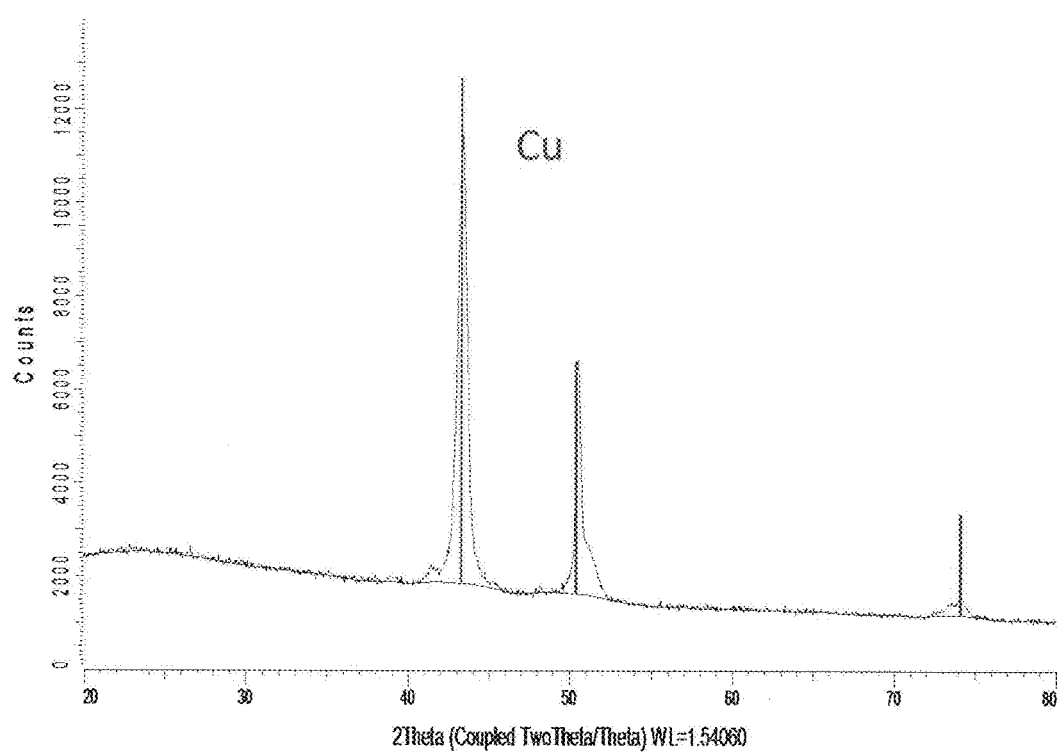
FIG. 12 shows XRD spectra of Cu nanowires (without a $La_{1-x}Ba_xF_{3-x}$ or $LaF_3$ coating) having a cross-sectional diameter of about or less than 20 nm, according to some aspects of the present disclosure.
Figure 13A:
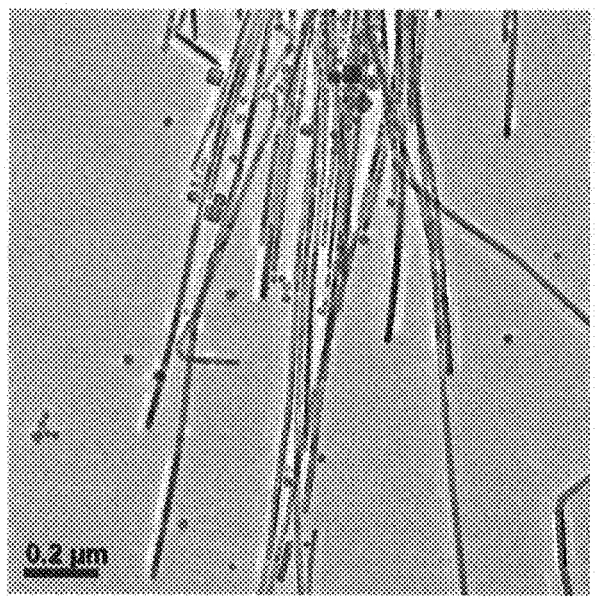
FIG. 13A and FIG. 13B show TEM images of Cu nanowires (without a $La_{1-x}Ba_xF_{3-x}$ or $LaF_3$ coating) having a cross-sectional diameter of about 20 nm.
Figure 13B:
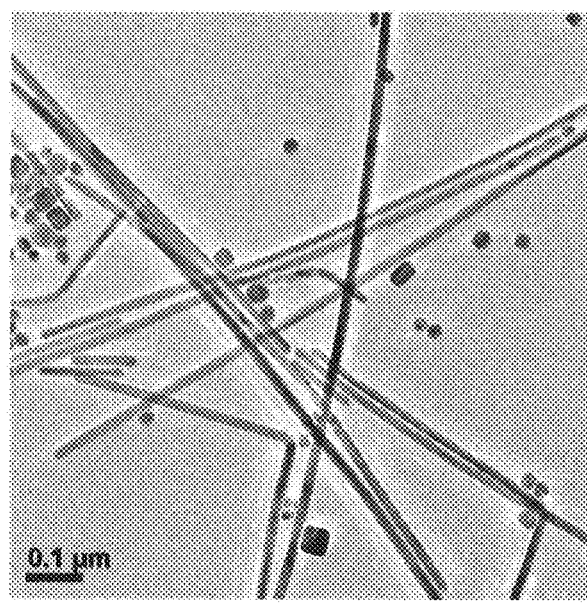

The method of synthesizing Cu nanowires has been reported in F Cui et al., Synthesis of Ultrathin Copper Nanowires Using Tris(trimethylsilyl)silane for High-Performance and Low-Haze Transparent Conductors, *Nano Letters* 2015, 15, 7610-7615, the entirety of which is incorporated herein by reference. In this example, a solution of $CuCl_2$ $2H_2O$ (85 mg, 0.5 mmol) in oleylamine (5 g, 18.7 mmol) and oleic acid (0.1 g, 0.354 mmol) was sonicated in a glass vial until completely dissolved. Tris(trimethylsilyl)silane (0.5 g, 2.0 mmol) was added, and the mixture was heated up to 120° C. until the dark blue solution turned clear yellow. The mixture was heated further to 165° C. for 18 h. The Cu nanowires were isolated via centrifuge (12,000 rpm for 10 min.) and washed three times with toluene (10 mL). The XRD spectra and TEM images of the Cu nanowires produced in this example are illustrated in FIGS. 12 and 13, respectively.

Figure 19:
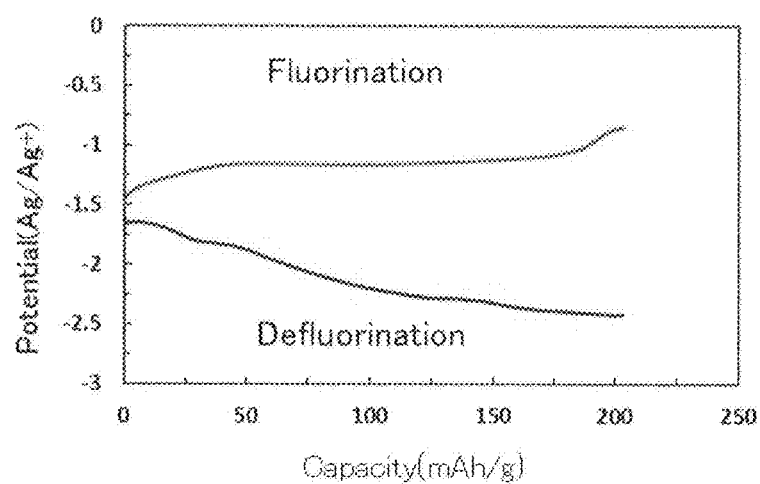
FIG. 19 shows the voltage profile of the charge-discharge cycle of an electrode made of Cu nanowires (with an average diameter about or less than 20 nm) encapsulated in soft shells (surfactant shells), according to some aspects of the present disclosure.

Example 6. Voltage Profile of the Charge-Discharge Cycle and XRD Characterization of a Cathode Made of CuNW@Soft Shell A cathodic electrode was prepared using CuNW@soft shell nanomaterial of Example 5. The average cross-sectional diameter of CuNW core is about 20 nm. The voltage profile of the charge-discharge cycle of the CuNW@soft shell electrode is shown in FIG. 19. The $Ag/Ag^+$ electrode was used as the reference in the experiment. According to FIG. 19, the capacity of 20 nm CuNW@soft shell cathode may reach above 200 mAh/g.

Figure 20:
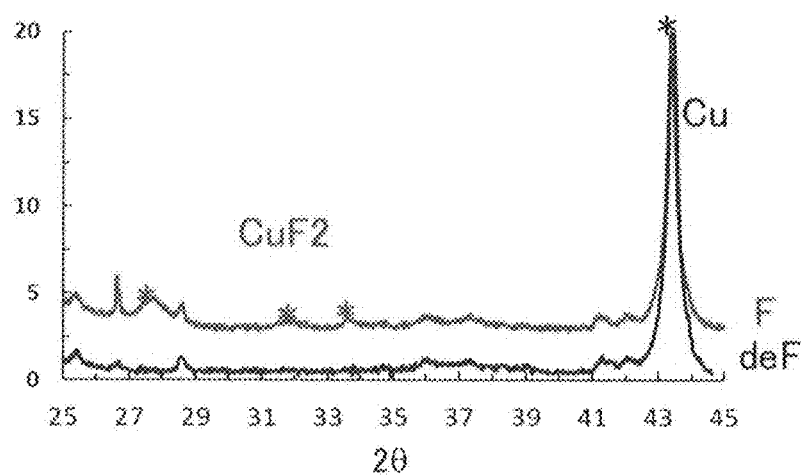
FIG. 20 shows the XRD spectra of CuNW@soft shell (surfactant shell) after a charge (fluorination) and after a subsequent discharge (defluorination), according to some aspects of the present disclosure. The Cu nanowires in the Fig have an average diameter about or less than 20 nm.

CuNW@soft shell electrode was further characterized by XRD and the experimental results are illustrated in FIG. 20. FIG. 20 shows the XRD spectra of CuNW@soft shell after a charge (fluorination) and after a subsequent discharge (defluorination), respectively. $CuF_2$ can be formed after charge and then reduced to Cu after discharge. FIG. 20 indicates that Cu in the form of nanowires coupled with surfactant soft shells can be cycled in liquid electrolytes.

Example 7. Comparison of Cathodes Made of Cu Nanostructures

A series of cathodes having Cu nanostructures for F-shuttle batteries had been prepared. The Cu nanostructures used in the preparation of cathodes are CuNP@$LaF_3$ with a core having an average diameter about 50 nm, CuNP@$La_{0.97}Ba_{0.03}F_{2.97}$ with a core having an average diameter about 50 nm, CuNW@$LaF_3$ with a core having an average cross-sectional diameter about 20 nm, and CuNW@soft shells with a core having an average cross-sectional diameter about 20 nm.

Figure 24:
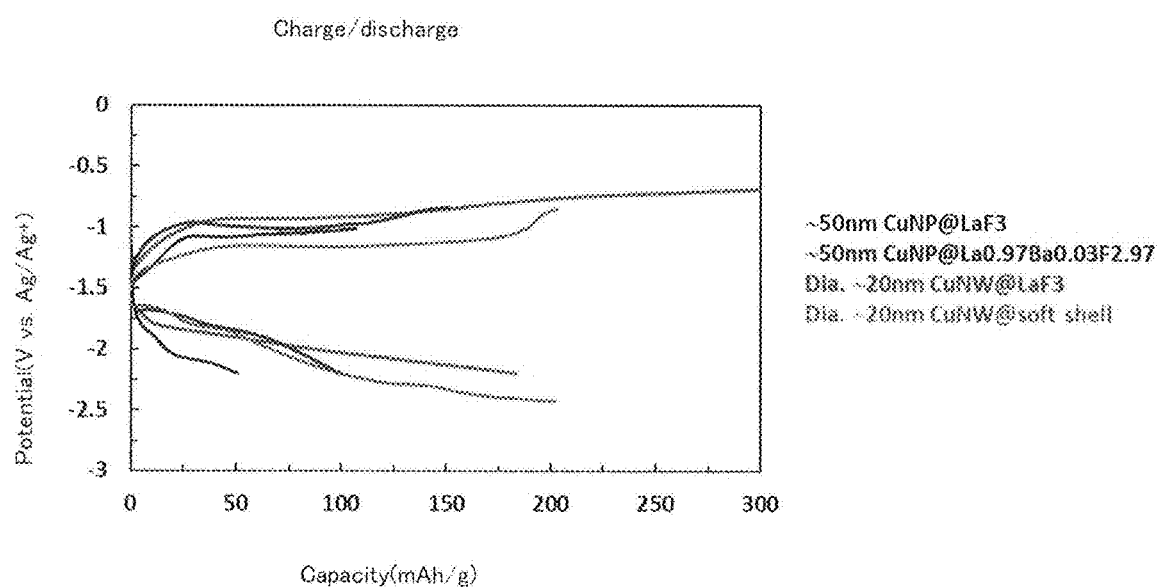
FIG. 24 depicts the voltage profiles of the charge-discharge cycles of a variety electrodes. The electrodes in the figure are made of about 50 nm CuNP@$LaF_3$, about 50 nm CuNP@$La_{0.97}Ba_{0.03}F_{2.97}$, about 20 nm CuNW@$LaF_3$, and about 20 nm CuNW@soft shell, respectively.

FIG. 24 illustrates the voltage profiles of the charge-discharge cycles of a variety electrodes, which include about 50 nm CuNP@$LaF_3$, about 50 nm CuNP@$La_{0.97}Ba_{0.03}F_{2.97}$, about 20 nm CuNW@$LaF_3$, and about 20 nm CuNW@soft shell, respectively. The $Ag/Ag^+$ electrode was used as the reference in the experiment. In FIG. 24, capacities of 20 nm Cu nanowires encapsulated in either $LaF_3$ shells or in surfactant soft shells are clearly higher than 50 nm Cu nanoparticles encapsulated in either $LaF_3$ or $La_{0.97}Ba_{0.03}F_{2.97}$ shells.

Figure 25:
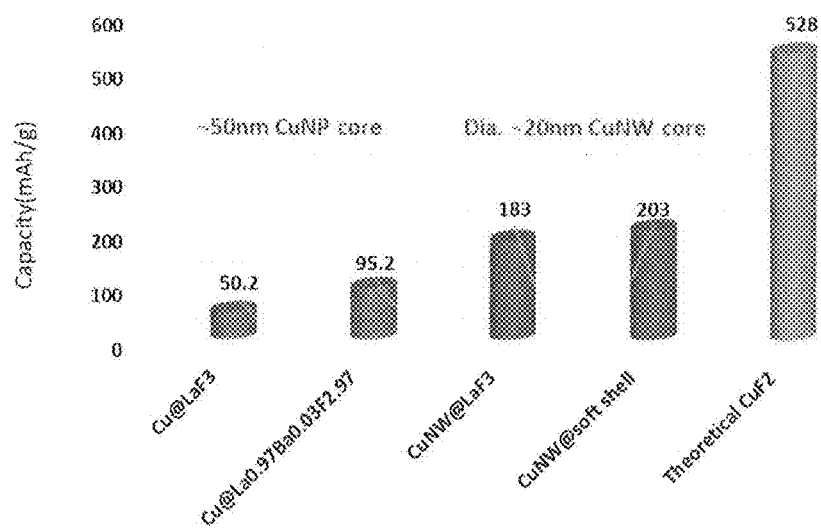
FIG. 25 shows a comparison of the capacity achieved for about 50 nm CuNP@$LaF_3$, about 50 nm CuNP@$La_{0.97}Ba_{0.03}F_{2.97}$, about 20 nm CuNW@$LaF_3$, about 20 nm CuNW@soft shell, and the theoretical capacity of $CuF_2$, according to some aspects of the present disclosure.

As shown in FIG. 25, the capacities of electrodes made of 50 nm CuNP@$LaF_3$, 50 nm CuNP@$La_{0.97}Ba_{0.03}F_{2.97}$, 20 nm CuNW@$LaF_3$, and 20 nm CuNW@soft shell are 50.2, 95.2, 183, and 203 mAh/g, respectively. Thus, the electrodes made of Cu nanowires encapsulated in $LaF_3$ shells or soft shells nearly double the capacity of CuNP@$La_{0.97}Ba_{0.03}F_{2.97}$ and nearly has four times the capacity of CuNP@$LaF_3$. As a comparison, the theoretical capacity of electrode made of $CuF_2$ is about 528 mAh/g.

Figure 26:
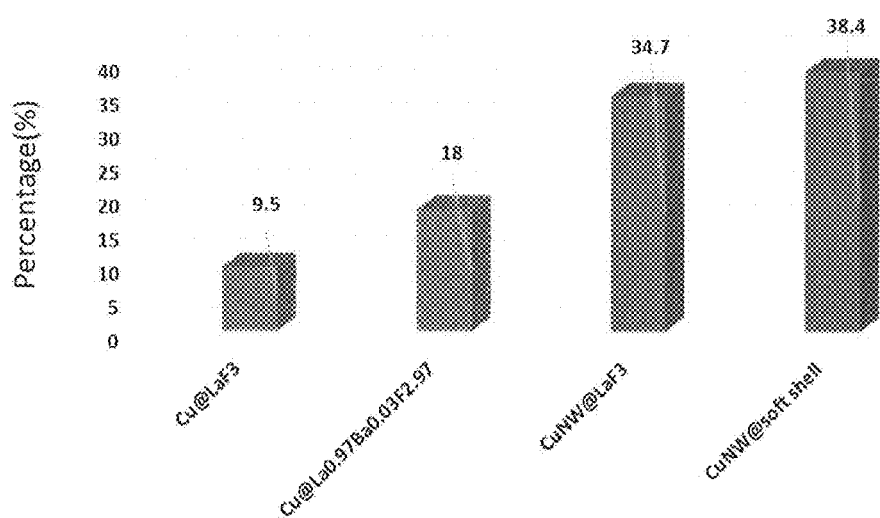
FIG. 26 demonstrates percentage capacity achieved for about 50 nm CuNP@$LaF_3$, about 50 nm CuNP@$La_{0.97}Ba_{0.03}F_{2.97}$, and about 20 nm CuNW@$LaF_3$, about 20 nm CuNW@soft shell, which are normalized by the theoretical capacity of $CuF_2$ (528 mAh/g).

Furthermore, the capacity delivery of cathodes in FIG. 25 is normalized against the theoretical capacity of $CuF_2$ to obtain percentile capacity of each electrode. The percentile capacities of all tested electrodes are illustrated in FIG. 26. FIG. 26 indicates that capacities of electrodes made of 20 nm Cu nanowires encapsulated in $LaF_3$ shells and surfactant soft shells can reach 34.7% and 38.4% of theoretical capacity of $CuF_2$, respectively.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A fluoride shuttle battery comprising:
   a cathode comprising a metal nanostructure core including at least one dimension that is less than or equal to 20 nm, and a shell at least partially surrounding the metal nanostructure core;
   an anode; and
   a liquid electrolyte containing fluoride ions,
   wherein the metal nanostructure core consists of a first material, the first material comprising a first metal,
   wherein the shell consists of a shell material that is different from the first material, and
   wherein the shell material comprises $La_{1-x}Ba_xF_{3-x}$, wherein X=0–0.5.

2. The fluoride shuttle battery of claim 1, wherein the metal nanostructure core comprises a nanoparticle with a diameter of less than or equal to 20 nm.

3. The fluoride shuttle battery of claim 1, wherein the metal nanostructure core comprises one or more cylindrical structures including a diameter of less than or equal to 20 nm and a length of greater than 20 nm.

4. The fluoride shuttle battery of claim 3, wherein the cylindrical structures comprise structures selected from nanotubes, nanowires, nanoframes, and combinations thereof.

5. The fluoride shuttle battery of claim 1, wherein the metal nanostructure core comprises one or more sheetlike structures including a thickness of less than or equal to 20 nm and another dimension that is greater than 20 nm.

6. The fluoride shuttle battery of claim 5, wherein the sheetlike structures comprises structures selected from flake structure, sheet structure, film structure, and combinations thereof.

7. The fluoride shuttle battery of claim 1, wherein the metal nanostructure core comprises a complex shape comprising interconnected metal portions and channels defining a network of pores wherein each channel comprises at least one dimension that is less than 25 nm.

8. The fluoride shuttle battery of claim 7, wherein the complex shape comprises porous nanosheets, nanoframes, or foams.

9. The fluoride shuttle battery of claim 1, wherein the metal nanostructure core has a thickness of no more than 20 nm.

10. The fluoride shuttle battery of claim 1, wherein the metal nanostructure core has a thickness of no more than 6 nm.

11. The fluoride shuttle battery of claim 1, wherein X=0.

12. The fluoride shuttle battery of claim 1, wherein X=0.03.

13. The fluoride shuttle battery of claim 1, wherein the shell has a thickness of no more than 5 nm.

14. The fluoride shuttle battery of claim 1, wherein a ratio of thickness between the metal nanostructure core and the shell is from about 10:1 to about 1:1.

15. The fluoride shuttle battery of claim 14, wherein the ratio of thickness between the metal nanostructure core and the shell is about 4:1.

16. The fluoride shuttle battery of claim 14, wherein the ratio of thickness between the metal nanostructure core and the shell is about 1:1.

17. The fluoride shuttle battery of claim 1, wherein the first metal is selected from a transitional metal, salts of the transition metal, and mixtures thereof.

18. The fluoride shuttle battery of claim 17, wherein the transition metal is selected from d-block of the periodic table of the elements, including the lanthanide and actinide series.

19. The fluoride shuttle battery of claim 17, wherein the transition metal is selected from scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, lawrencium, and mixtures thereof.

20. The fluoride shuttle battery of claim 17, wherein the transition metal comprises copper.

21. The fluoride shuttle battery of claim 20, wherein the copper nanostructure core comprises a copper nanowire, the copper nanowire having an average cross-sectional diameter of no more than about 20 nm.

22. The fluoride shuttle battery of claim 21, wherein the copper nanowire is enclosed by a $LaF_3$ shell layer.

23. The fluoride shuttle battery of claim 22, wherein the copper nanowire enclosed by the $LaF_3$ shell has an energy capacity of about 183 mAh/g or of about 34.7% of a theoretical capacity of $CuF_2$.

24. The fluoride shuttle battery of claim 1, wherein the shell material comprises a soft shell material.

25. The fluoride shuttle battery of claim 24, wherein the soft shell layer comprises a surfactant.

26. The fluoride shuttle battery of claim 24, wherein the soft shell layer comprises a polymer or oligomer.

27. The fluoride shuttle battery of claim 25, wherein the surfactant comprises oleylamine, oleic acid, tris(trimethylsilyl)silane, or a combination thereof.

28. The fluoride shuttle battery of claim 26, wherein the polymer is selected from the group consisting of polyvinylpyrrolidone, poly(methyl methacrylate), and combinations thereof.

29. The fluoride shuttle battery of claim 24, wherein the shell comprises at least a first self-assembled monolayer.

30. The fluoride shuttle battery of claim 29, wherein the shell further comprises a second self-assembled monolayer, wherein the second self-assembled monolayer covers at least a portion of the first self-assembled monolayer.

31. The fluoride shuttle battery of claim 29, wherein the shell further comprises a polymer layer, wherein the polymer layer covers at least a portion of the first self-assembled monolayer.

32. The fluoride shuttle battery of claim 24, wherein the nanostructure core comprises a copper nanowire, the copper nanowire having an average cross-sectional diameter of no more than about 20 nm.

33. The fluoride shuttle battery of claim 32, wherein the copper nanowire is enclosed by a soft shell layer, the soft shell layer comprising a surfactant.

34. The fluoride shuttle battery of claim 24, wherein the soft shell material is permeable to $F^{31}$ ion.

35. The fluoride shuttle battery of claim 33, wherein the copper nanowire enclosed by the soft shell has an energy capacity of about 203 mAh/g or of about 38.4% of a theoretical capacity of $CuF_2$.

36. A fluoride shuttle battery comprising:
an electrode comprising a metal nanostructure core including at least one dimension that is less than or equal to 25 nm, and a shell at least partially surrounding the metal nanostructure core; and
a liquid electrolyte,
wherein the metal nanostructure core consists of a first material, the first material comprising a first metal,
wherein the shell consists of a shell material that is different from the first material, and
wherein the shell material comprises $La_{1-x}Ba_xF_{3-x}$, wherein X=0–0.5.

37. The fluoride shuttle battery of claim 36, wherein the metal nanostructure core comprises one or more cylindrical structures including a diameter of less than or equal to 25 nm and a length of greater than 25 nm.

38. The fluoride shuttle battery of claim 37, wherein the cylindrical structures are chosen from nanotube, nanowire, and nanoframe.

39. The fluoride shuttle battery of claim 36, wherein the metal nanostructure core comprises a sheetlike structure including a thickness of less than or equal to 25 nm and another dimension that is greater than 25 nm.

40. The fluoride shuttle battery of claim 39, wherein the sheetlike structure is flake structure, sheet structure, or film structure.

41. The fluoride shuttle battery of claim 1, wherein the metal nanostructure core comprises a complex shape comprising interconnected metal portions and channels defining a network of pores wherein each channel comprises at least one dimension that is less than 25 nm.

42. The fluoride shuttle battery of claim 7, wherein the network of pores are porous nanosheets, nanoframes, or foams.

43. The fluoride shuttle battery of claim 36, wherein the at least one dimension is from 1 to 20 nm.

44. The fluoride shuttle battery of claim 36, wherein the at least one dimension is from 1 to 10 nm.

45. The fluoride shuttle battery of claim 36, wherein the shell has a thickness from 1 nm to 1 micrometer.

46. The fluoride shuttle battery of claim 36, wherein the shell has a thickness from 1 nm to 200 nm.

47. A fluoride shuttle battery comprising:
a liquid electrolyte containing fluoride ions; and
a cathode comprising a material comprising:
a metal nanostructure core consisting of a first material, the first material comprising a metal capable of forming a metal fluoride having a theoretical capacity in the liquid electrolyte, the metal nanostructure core includes at least one lesser dimension,
a shell surrounding the metal nanostructure core, wherein the shell includes a thickness and consists of a shell material that is different from the first material, wherein the thickness of the shell and the lesser dimension of the metal nanostructure core are provided in a ratio wherein a capacity of a material in the liquid electrolyte is from at least 25% to 45% of the theoretical capacity of the metal fluoride, and
wherein the shell material comprises $La_{1-x}Ba_xF_{3-x}$, wherein X=0–0.5.

* * * * *